(12) United States Patent
Miller

(10) Patent No.: US 10,107,555 B1
(45) Date of Patent: Oct. 23, 2018

(54) HEAT EXCHANGER ASSEMBLY

(71) Applicant: Unison Industries, LLC, Jacksonville, FL (US)

(72) Inventor: Samuel Noah Miller, Cincinnati, OH (US)

(73) Assignee: Unison Industries, LLC, Jacksonville, FL (US)

(*) Notice: Subject to any disclaimer, the term of this patent is extended or adjusted under 35 U.S.C. 154(b) by 0 days.

(21) Appl. No.: 15/493,676

(22) Filed: Apr. 21, 2017

(51) Int. Cl.
| | |
|---|---|
| F28F 9/02 | (2006.01) |
| F28D 7/00 | (2006.01) |
| F28C 3/06 | (2006.01) |
| F28D 7/16 | (2006.01) |
| B23P 15/26 | (2006.01) |

(52) U.S. Cl.
CPC ............ *F28D 7/0008* (2013.01); *B23P 15/26* (2013.01); *F28C 3/06* (2013.01); *F28D 7/16* (2013.01)

(58) Field of Classification Search
CPC . F28D 9/00; F28D 9/0012; F28D 9/02; F28D 7/0008; F28D 7/16; B23P 15/26; F28C 3/02; F28F 13/06; F28F 13/02; F28F 13/00; F28F 9/02; F28F 9/0229; F28F 2009/029
USPC ........................................................ 165/173
See application file for complete search history.

(56) References Cited

U.S. PATENT DOCUMENTS

| | | | |
|---|---|---|---|
| 4,787,443 A | 11/1988 | Fukatsu et al. | |
| 5,269,372 A | 12/1993 | Chu et al. | |
| 5,927,097 A | 7/1999 | Wright | |
| 6,221,463 B1 | 4/2001 | White | |
| 7,646,608 B2 | 1/2010 | Thompson et al. | |
| 7,866,377 B2 | 1/2011 | Slaughter | |
| 7,997,328 B2 | 8/2011 | Kim et al. | |
| 9,915,047 B2 * | 3/2018 | Burt | E02B 3/062 |
| 2014/0251585 A1 | 9/2014 | Kusuda et al. | |
| 2015/0152614 A1 * | 6/2015 | Burt | E02B 3/06 405/23 |
| 2016/0076384 A1 | 3/2016 | Snyder et al. | |
| 2016/0131441 A1 | 5/2016 | Newman et al. | |
| 2016/0202003 A1 | 7/2016 | Gerstler et al. | |

FOREIGN PATENT DOCUMENTS

WO     2016057443 A1    4/2016

* cited by examiner

*Primary Examiner* — Davis Hwu
(74) *Attorney, Agent, or Firm* — Unison Industries, LLC; William Andes

(57) ABSTRACT

An apparatus and method of forming a heat exchanger can include a first manifold that defines a first fluid inlet to the heat exchanger and a second manifold that defines a second fluid inlet to the heat exchanger. A lattice cell body can be provided in the heat exchanger that can form a first set of flow passages and a second set of flow passages. The first and second sets of flow passages can be intertwined with one another.

20 Claims, 29 Drawing Sheets

US 10,107,555 B1

HEAT EXCHANGER ASSEMBLY

BACKGROUND OF THE INVENTION

Contemporary engines used in aircraft produce substantial amounts of heat that must be transferred away from the engine in one way or another. Heat exchangers provide a way to transfer heat away from such engines.

Oil can be used to dissipate heat from engine components, such as engine bearings, electrical generators, and the like. Heat is typically transferred from the oil with heat exchangers to maintain oil temperatures at a desired range from approximately 100° F. to 300° F. In many instances, an external environment can be as low as −65° F. In such an example, a flow of cool air can be used to cool the oil at the heat exchanger with force convection. Other applications utilize air, fuel, and oil to both cool and heat one another, depending on the need.

Additionally, heat exchangers can be placed in the aircraft for dissipating heat generated by electrical systems, such as within an avionics chassis. The heat exchangers can include a plurality of elements, such as conduits, to draw heat from the electrical components. The heat exchanger can be used to dissipate the heat drawn from the electrical components.

BRIEF DESCRIPTION OF THE INVENTION

In one aspect, the present disclosure relates to a heat exchanger including a first manifold defining a first fluid inlet and a second manifold defining a second fluid inlet. A lattice cell body has a first set of flow passages in fluid communication with the first manifold. The first set of flow passages includes a set of first furcated flow passages extending from the first fluid inlet. The set of first furcated flow passages converge to a first interconnecting passage that forms a hyperbolic shape and diverges into another set of first furcated flow passages. The lattice cell body further includes a second set of flow passages in fluid communication with the second manifold and the second set of flow passages includes a set of second furcated flow passages extending from the second fluid inlet. The set of second furcated flow passages converge to a second passage that forms a hyperbolic shape and diverges into another set of second furcated flow passages. At least a portion of the first furcated flow passages are intertwined with at least a portion of the second furcated flow passages.

In another aspect, the present disclosure relates to a heat exchanges having a body with a first set of hyperbolic flow passages in flow communication with a first fluid inlet. The first set of hyperbolic flow passages include a set of first furcated flow passages that include a number of saddle points, at which two of the set of first furcated flow passages asymptotically converge along one plane, and then asymptotically diverge on an orthogonal plane. A second set of hyperbolic flow passages is in fluid communication with a second fluid inlet. The second set of hyperbolic flow passages include a set of second furcated flow passages that include a number of saddle points, at which two of the set of second furcated flow passages asymptotically converge along one plane and then asymptotically diverge on an orthogonal plane. At least a portion of the first furcated flow passages and at least a portion of the set of furcated second flow passages intertwine.

In yet another aspect, the present disclosure relates to a method of forming a heat exchanger including forming a lattice cell body wherein the lattice cell body includes a set of first furcated flow passages and wherein the set of first furcated flow passages converge to a first passage that has a hyperbolic shape and diverge into another set of first furcated flow passages, and wherein the lattice cell body further includes a set of second furcated flow passages wherein the set of second furcated flow passages converge to a second passage that has a hyperbolic shape and diverge into another set of second furcated flow passages. At least a portion of the first furcated flow passages are intertwined with at least a portion of the second furcated flow passages.

DETAILED DESCRIPTION OF THE INVENTION

Figure 1:
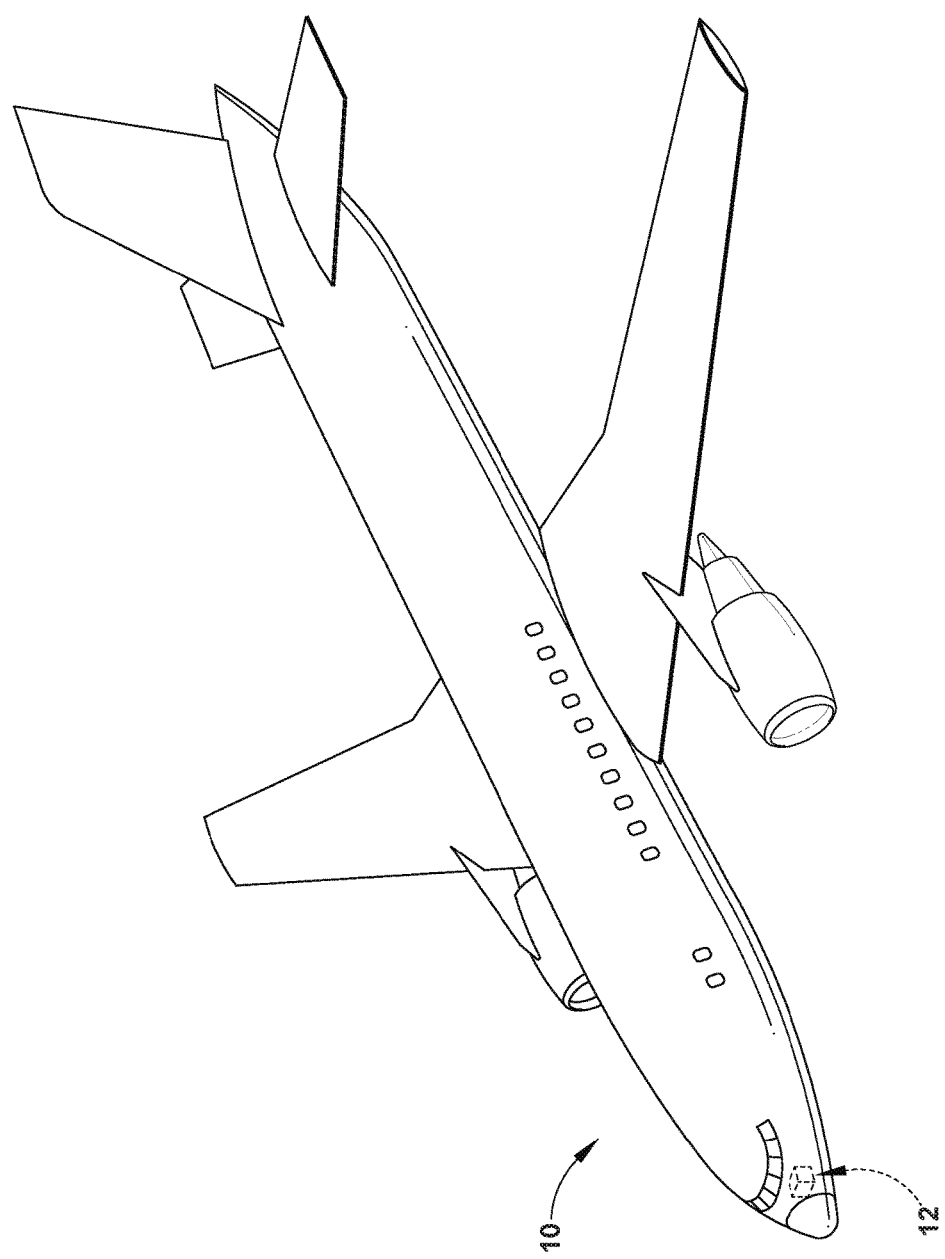
FIG. 1 is a perspective view of an aircraft having an avionics chassis in accordance with various aspects described herein.

Aspects of the disclosure described herein are directed to a heat exchanger assembly. For purposes of illustration, the present disclosure will be described with respect to a heat exchange provided in the interior of an aircraft. Namely, provided in an avionics chassis of the aircraft. It will be understood, however, that aspects of the disclosure described herein are not so limited and may have general applicability within any environment requiring or utilizing heat exchangers or convective heat transfer such as within a turbine engine for the aircraft, but also including non-aircraft applications, such as other mobile applications and non-mobile industrial, commercial, and residential applications.

As used herein, the term "forward" or "upstream" refers to moving in a direction being relatively closer to an inlet or source of a flow of fluid or gas. The term "aft" or "downstream" used in conjunction with "forward" or "upstream" refers to a direction being relatively closer to an outlet or end. As used herein, the term "set" can refer to one or more of an element. All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 schematically illustrates an aircraft 10 with an on-board avionics chassis assembly 12 (shown in dashed line), which can include a power management panel. The avionics chassis assembly 12 can house a variety of avionics elements and protect them against contaminants, vibrations, and the like and aids in dissipating the heat generated by the avionics or electronic components. It will be understood that the avionics chassis assembly 12 can be located anywhere within the aircraft 10, not just the nose as illustrated. For example, there can be any number of power management panels distributing power around the aircraft 10. While illustrated in a commercial airliner, the avionics chassis assembly 12 can be used in any type of aircraft, for example, without limitation, fixed-wing, rotating-wing, rocket, commercial aircraft, personal aircraft, and military aircraft. Furthermore, aspects of the disclosure are not limited only to aircraft aspects, and can be included in other mobile and stationary configurations. Non-limiting example mobile configurations can include ground-based, water-based, or additional air-based vehicles. Any implementation has its own space constraints and power requirements. As such, the design of the particular aspects of the avionics chassis assembly 12 as described herein can be tailored to suit specific installation requirements of the implementation.

Figure 2:
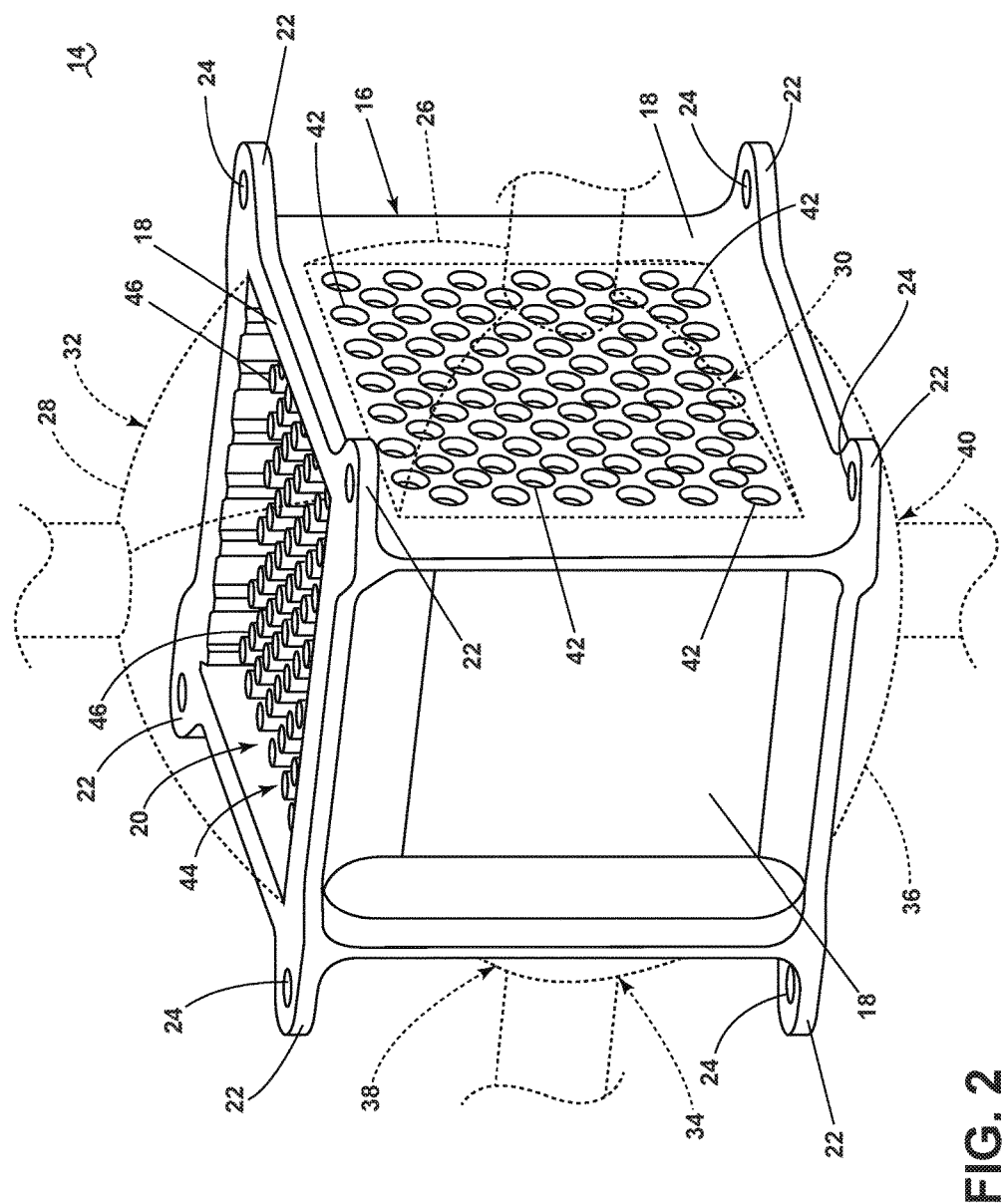
FIG. 2 is a perspective view of a heat exchanger interconnected to a set of manifolds for use in the avionics chassis of FIG. 1 in accordance with various aspects described herein.

Referring to FIG. 2, a heat exchanger 14 can be provided for the avionics chassis assembly 12 of FIG. 1 for dissipating or removing heat. A heat exchanger housing 16 can include a set of walls 18 to define an interior 20 for the heat exchanger 14. A set of tabs 22 can include mount apertures 24 in order to mount the heat exchanger 14 by affixing the housing 16 to another element, such as mounted to the avionics chassis 12.

A first manifold 26 and a second manifold 28 can couple to the heat exchanger 14 to define a first fluid inlet 30 and a second fluid inlet 32, respectively. Similarly, a third manifold 34 and a fourth manifold 36 can define a first fluid outlet 38 and a second fluid outlet 40, respectively. The first fluid inlet 30 can fluidly couple to the first fluid outlet 38 via a first flow path through the heat exchanger 14 and the second fluid inlet 32 can fluidly couple to the second fluid outlet 40 via a second flow path through the heat exchanger 14. It should be appreciated that the manifolds 26, 28, 34, 36 are illustrated in dashed line to better illustrate the heat exchanger 14. Further still, it will be understood that the manifolds 26, 28, 34, 36 have been illustrated merely for exemplary purposes and can include any suitable shaper, profile, couplings, etc.

A plurality of inlet openings 42 formed in the housing 16 can fluidly couple the interior 20 to the first inlet 30 and form a portion of the first flow path. A plurality of inlets 46 can fluidly couple the interior 20 to the second fluid inlet 32 and form a portion of the second flow path. Similarly, a set of openings or outlets can be provided at the third and fourth manifolds 34, 36 providing egress of fluid from the interior 20.

Figure 3:
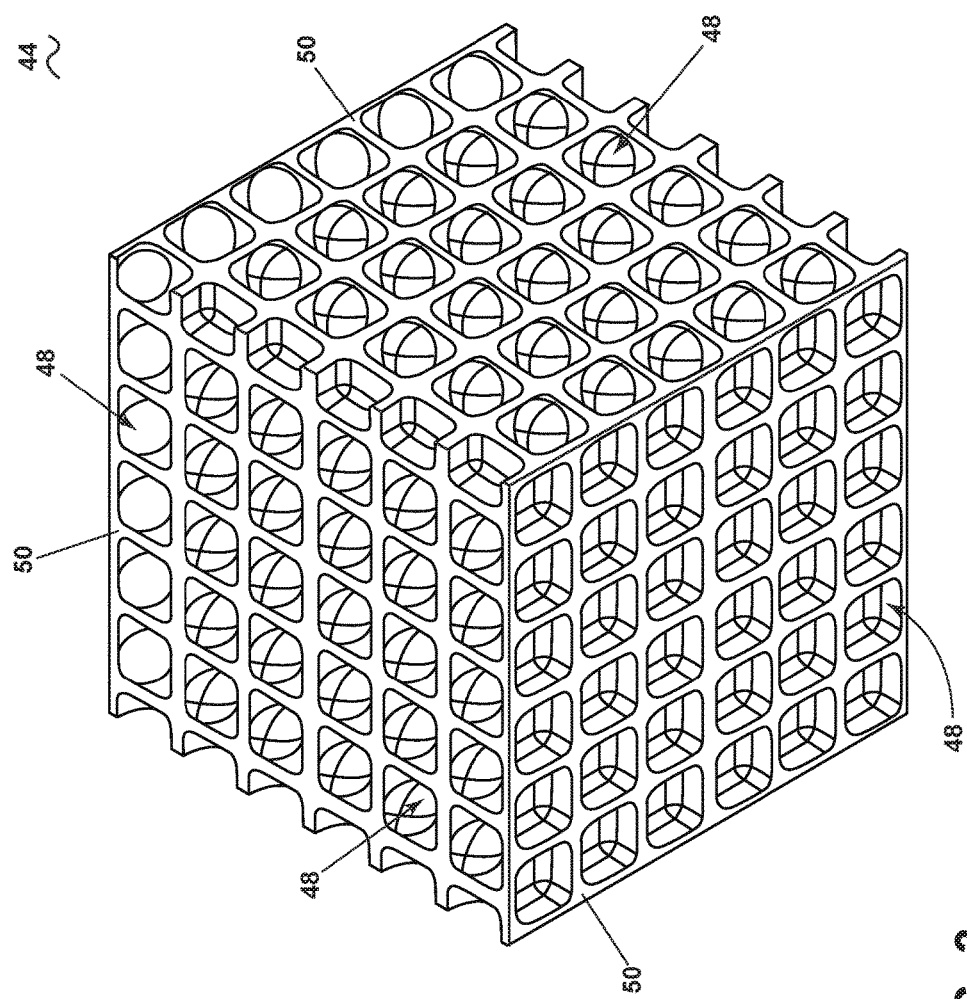
FIG. 3 is a perspective view of a lattice cell body forming sets of flow passages for use in the heat exchanger of FIG. 2 in accordance with various aspects described herein.

Referring to FIG. 3, a lattice cell body 44 can be a solid structure provided in the interior 20 of the housing 16 of FIG. 2 and can define portions of the first flow path and the second flow path. More specifically, the lattice cell body 44 can define a system of flow passages 48 that can define multiple inlets or outlets along an exterior wall 50 of the lattice cell body 44, while the flow passages 48 extend through the lattice cell body to form complex elongated fluid passages. The lattice cell body 44 is organized in a 6-by-6-by-6 configuration as shown. While shown as a single, integral 6-by-6-by-6 element, the lattice cell body 44 can be organized as having any dimension or shape, or can be made of multiple combined, smaller lattice cell bodies. In a first alternative example, the lattice cell body can be a 4-by-5-by-6 element, having additional interior walls beyond the exterior walls 50 alone. In another example, the lattice cell body 44 could be a combination of eight 3-by-3-by-3 elements that are attached to one another interconnecting the flow passages 48. It should be appreciated that the lattice cell body 44 can include any number of cells to be any suitable size defining any number of flow passages 48. The flow passages 48 can be in fluid communication with the manifolds 26, 28, 34, 36 of FIG. 2, in order to provide fluid ingress and egress through the lattice cell body 44 to define portions of the first flow path and the second flow path.

Figure 4:
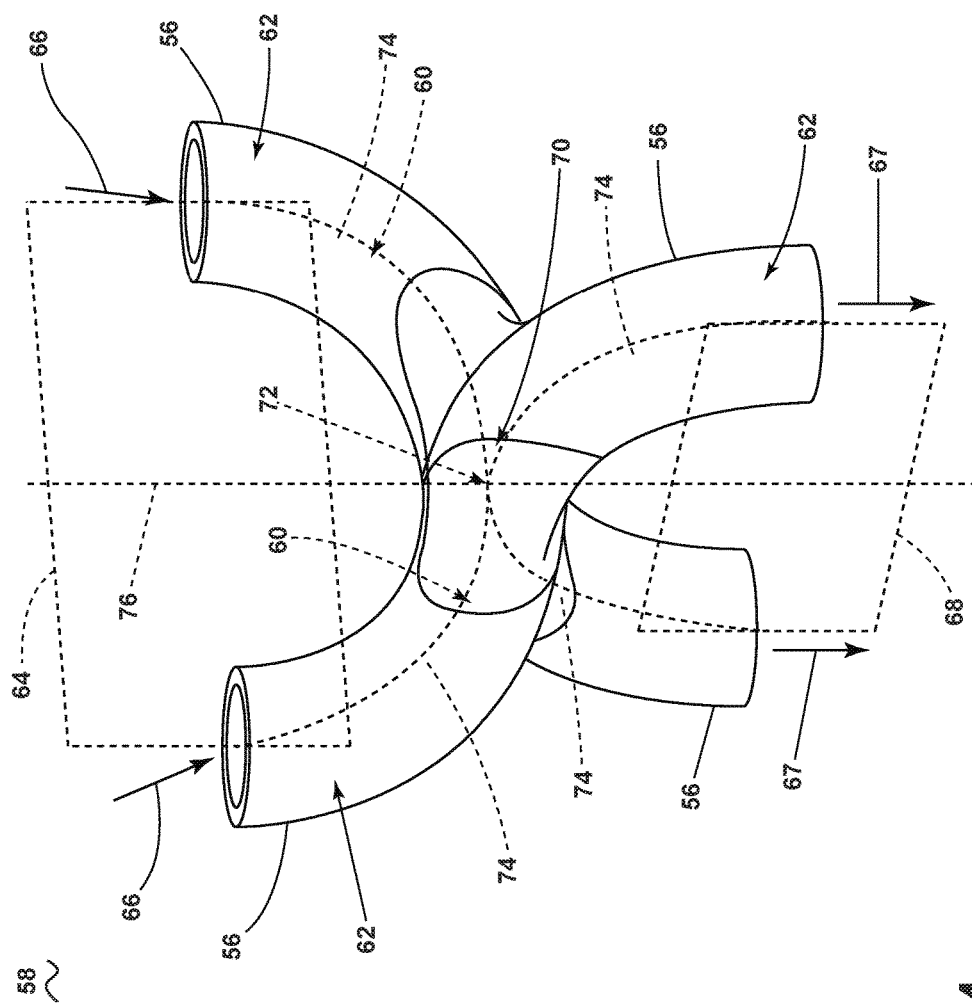
FIG. 4 is a schematic view of a portion of one of the sets of flow passages of the lattice cell body of FIG. 3 having a hyperbolic shape in accordance with various aspects described herein.

Referring to FIG. 4, a hyperbolic shape 60 is illustrated, where such a hyperbolic shape can be included to define portions of the flow passages 48. By way of non-limiting example, a first set of flow passages 58 such as for the first flow path can include a first set of furcated flow passages 62. The first set of furcated flow passages 62 is separated into two branches 56 that asymptotically converge along a first plane 64 in a first direction, represented by arrows 66, to a first interconnecting passage 70. The first set of flow passages 58 then diverges in a second direction, represented by arrows 67, to another first set of furcated flow passages 62 having two branches 56. The first interconnecting passage 70 fluidly couples the branches 56 of both the converging and diverging first sets of furcated flow passages 62. The diverging first set of furcated flow passages 62 define a second plane 68 that is oriented orthogonal to the first plane 64 relative to a longitudinal axis 76 defined through the first interconnecting passage 70. Furthermore, both the first and second planes 64, 68 are parallel to the longitudinal axis 76.

A first saddle point 72 is defined by the first flow passage 58 converging to and diverging from the first interconnecting passage 70 to define the hyperbolic shape 60, shown by lines 74. The saddle point 72 can define an inflection point for a flow path defined by the first flow passage 58.

Figure 5:
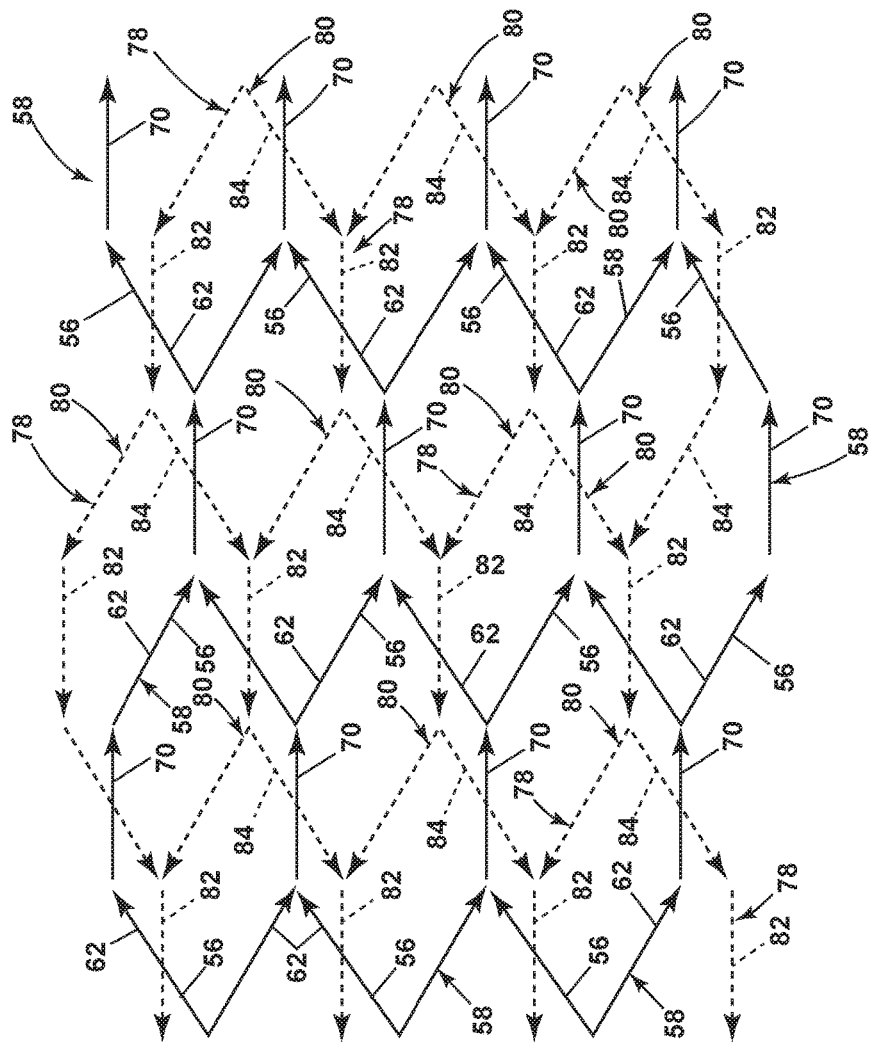
FIG. 5 is a schematic view of two sets of flow passages intertwined within one another having interconnecting passages aligned with furcated passages for opposing flow passages in accordance with various aspects described herein.

Referring now to FIG. 5, a schematic of the lattice cell body 44 is illustrated wherein arrows represent the flow passages 48 for both the first flow path and the second flow path, the lattice cell body 44 includes the first set of flow passage 58, illustrated in solid line, including alternating sets of furcated flow passages 62 and interconnecting passages 70. The lattice cell body 44 further includes a second set of flow passages 78, illustrated in dashed line for ease of identification, having a second set of furcated flow passages 80 with two branches 84 that converge to and diverge from second interconnecting passages 82. While illustrated schematically, it should be understood that the second set of furcated flow passages 80 can have the same hyperbolic shape and geometry as the first flow passage 58 described in FIG. 4.

The second set of flow passages 78 intertwines with the first set of flow passages 58, illustrated in solid line for ease of identification, with the first and second sets of flow passages 58, 78 remaining fluidly isolated from one another. The second interconnecting passages 82 can be arranged adjacent to the first set of furcated flow passages 62, and the first interconnecting passages 70 can be arranged adjacent to the second set of furcated flow passages 80. Aligning the interconnecting passages 70, 82 with the first and second sets of furcated flow passages 62, 80 provides space for both the first and second sets of flow passages 58, 78 in the lattice cell body 44 in the intertwined configuration.

It should be further understood that each branch 56, 84 of the first and second sets of furcated flow passages 70, 82 forms a portion of both a converging set and a diverging set of furcated flow passages 62, 80. Each respective branch 56, 84 can diverge from one first or second interconnecting passage 70, 82, while simultaneously converging towards a downstream first or second interconnecting passage 70, 82. Additionally, as best described in the discussion of FIG. 4, each alternative set of furcated flow passages 62, 80 are oriented orthogonal to one another. As such, the first and second set of flow passages 58, 78 define a three-dimensional latticed or quasi-latticed structure that intertwines with one another. While the first and second flow passages 58, 78 are illustrated as flowing in substantially different direction, it should be understood that the flow direction is exemplary and can flow in any direction. In one alternative example, both the first and second flow passages 58, 78 could flow upwards, toward the top of the page as illustrated in FIG. 5.

Figure 6:
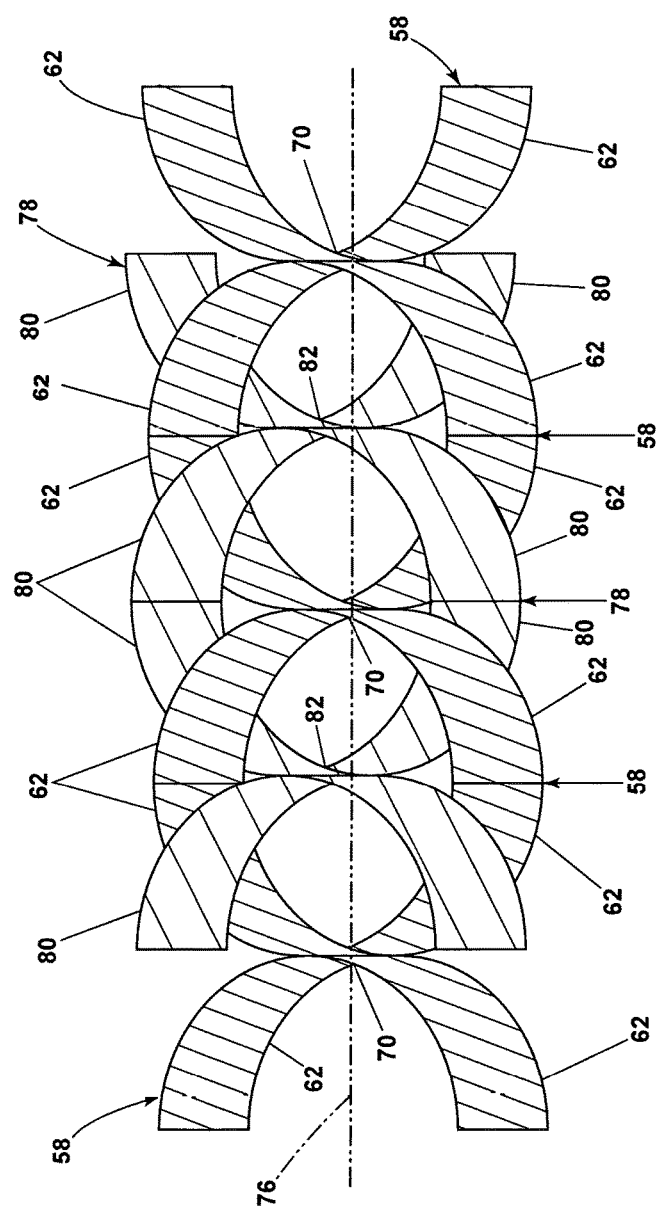
FIG. 6 is another schematic of two intertwined flow passages of the lattice cell body of FIG. 3 in accordance with various aspects described herein.

Referring now to FIG. 6, a schematic of a portion of the first set of flow passages 58 is illustrated intertwined with a portion of the second set of flow passage 78. As illustrated the first and second set of furcated flow passages 58, 78 are aligned with opposing first and second interconnecting passages 70, 82. In order to intertwine with one another, the first and second flow passage 58, 78 can be offset by forty-five degrees relative to the longitudinal axis 76 defined through the first or second interconnecting passages 70, 82, such that the first set of furcated flow passages 62 do not intersect the second set of furcated flow passages 80. Furthermore, alternating sets of furcated flow passages 62, 80 can pass in front of or behind one another, dependent on perspective, in order to intertwine through the opposing flow passage 58, 78. Similarly, while illustrated as substantially positioned on a common longitudinal axis 76, the axes defined by the first and the second flow passages 58, 78 can be spaced from one another and extend parallel to one another in three-dimensional space.

Figure 7:
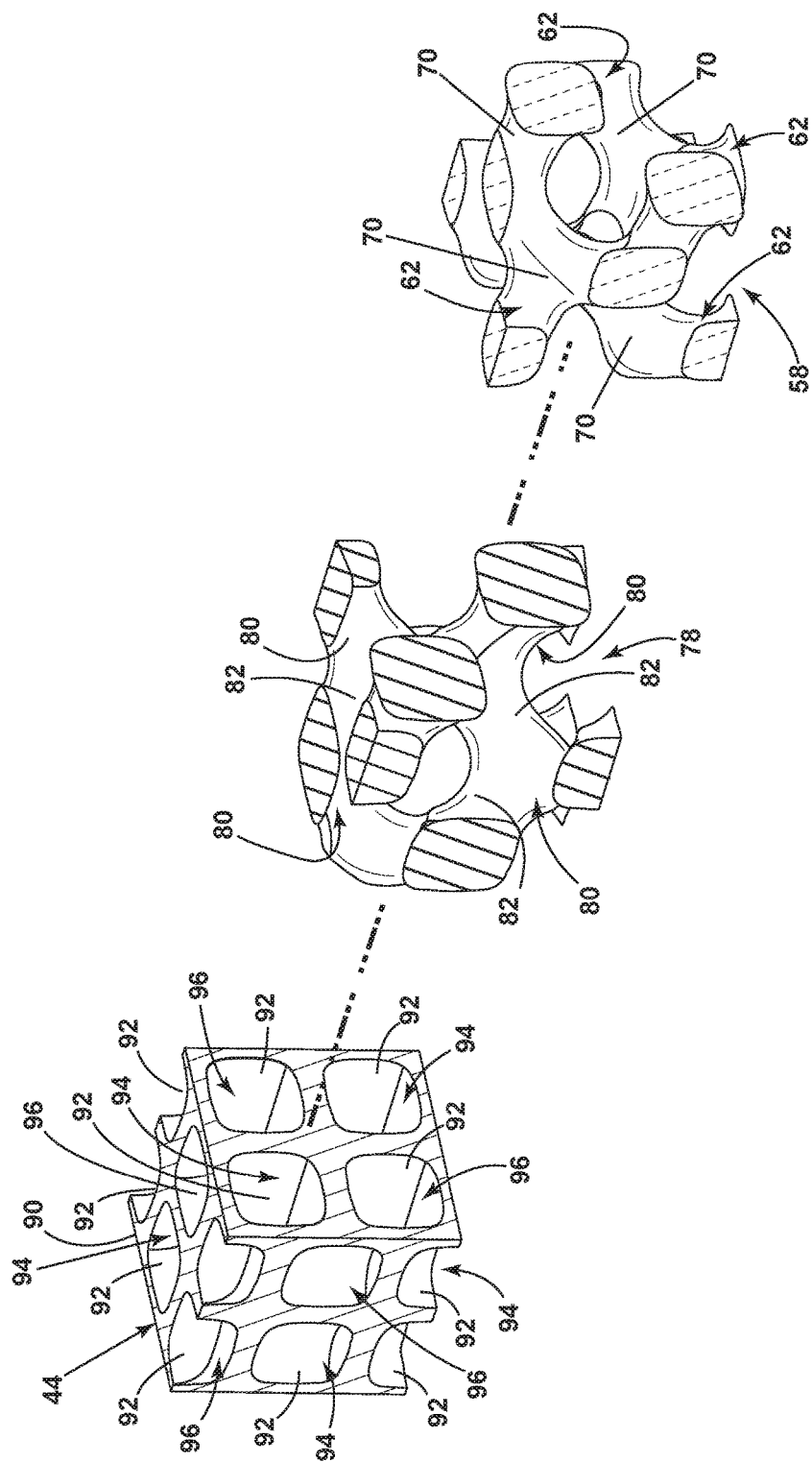
FIG. 7 is an exploded view of a portion of the lattice cell body of FIG. 3 having two sets of flow passages illustrated as solid elements defined by the lattice cell body in accordance with various aspects described herein.

FIG. 7 illustrates an exploded view of a 2-by-2-by-2, three dimensional portion 90 of the lattice cell body 44 having the first flow passage 58 and the second flow passage 78 illustrated as solid elements to better illustrate the geometry defined by the first and second flow passages 58, 78 within the lattice cell body 44. The shape of the lattice cell body 44 simultaneously separates the first and second flow passages 58, 78. A set of openings 92 are provided in lattice cell body 44 coupling to a first set of cavities 94 and a second set of cavities 96. The first set of cavities 94 can be fluidly coupled to define a first flow path through the lattice cell body representative of the first set of flow passages 58. The second set of cavities 96 can be fluidly coupled to define a second flow path representative of the second flow passage 78. The openings 92 and the first and second flow passages 58, 78 defined by the first and second sets of cavities 94, 96, in one non-limiting example, can have a rounded-square cross-section that continues throughout one or more of the first or second flow passage 58, 78. In alternative non-limiting examples, the first or second flow passages 58, 78 can have a profile that is squared, rectilinear, circular, oval, geometric, or otherwise. It is further contemplated that the cross-sectional area or shape of the first and second flow passages 58, 78 can be variable, accounting for the geometry defined by the hyperbolic shape transitioning between sets of furcated flow passages 62, 80 and interconnecting passages 70, 82.

Figure 8:
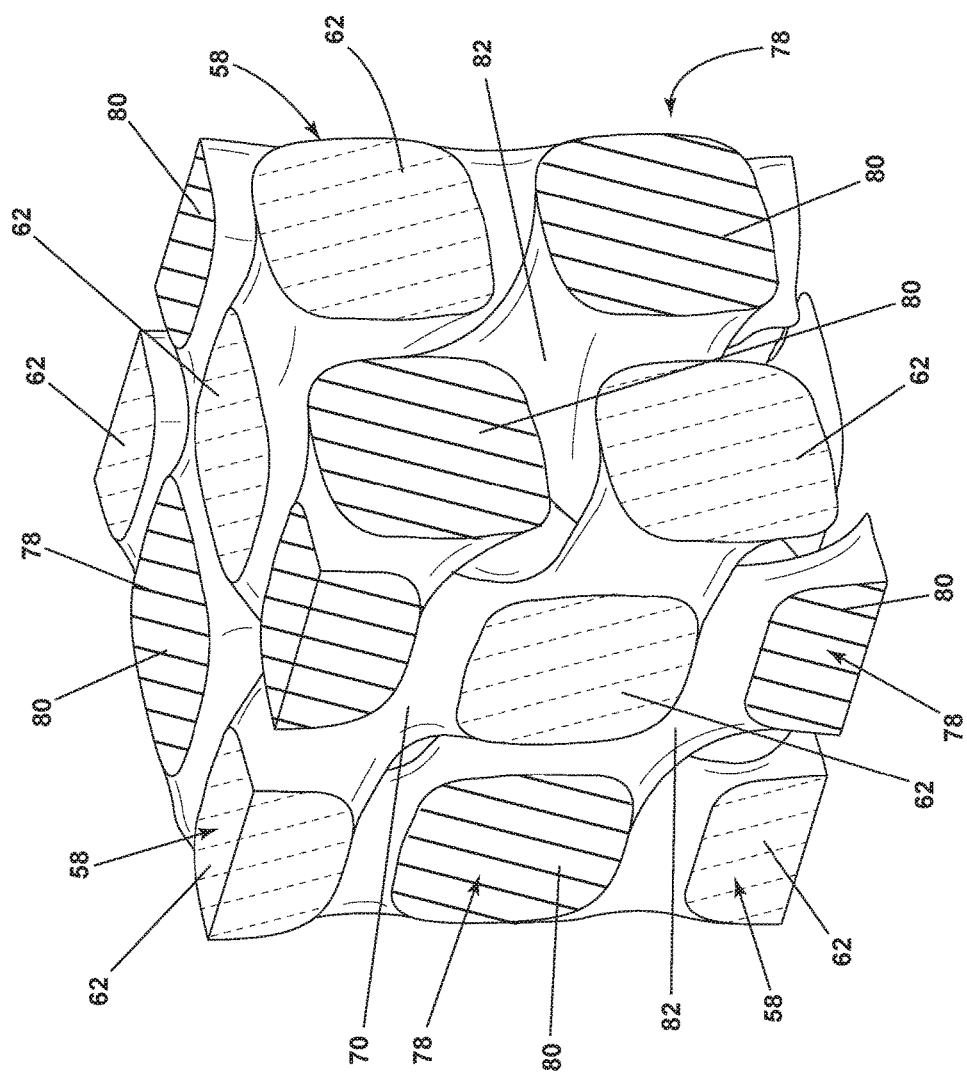
FIG. 8 is a perspective view of the two intertwined solid sets of flow passages of FIG. 7 having the lattice cell body removed.

The first and second sets of flow passages 58, 78 intertwine within one another, illustrated in three-dimensions in FIG. 8, with the first and second sets of furcated flow passages 62, 80 arranged complementary to opposing first and second interconnecting passages 70, 84. The first set of furcated passages 62 can surround the second interconnecting passage 80 of the second set of flow passages 78. Similarly, the second set of furcated flow passages 80 of the second set of flow passages 78 can surround the first interconnecting passage 70 of the first set flow passages 58. In such an arrangement, the first and second flow passages 58, 80 intertwine with one another throughout the lattice cell body 44.

Figure 9:
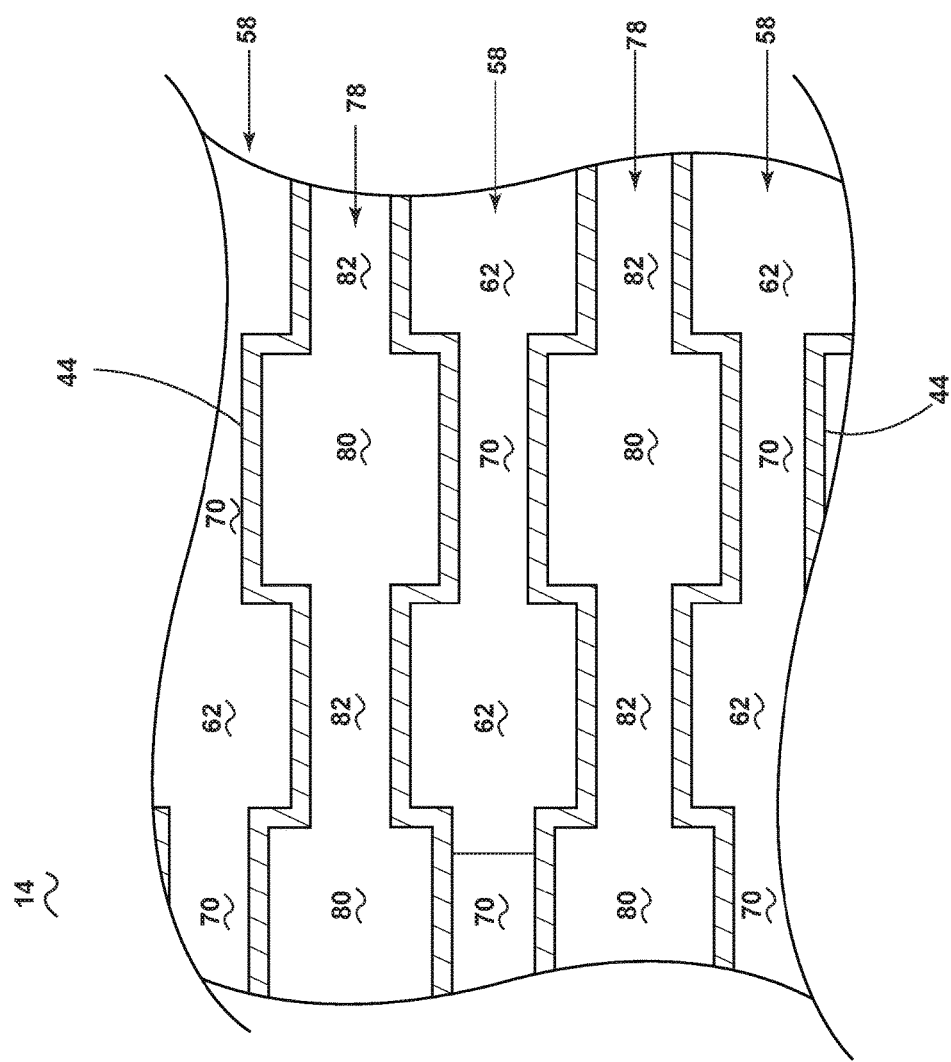
FIG. 9 is another schematic view of the lattice cell body and the sets of flow passages of FIG. 7 illustrating an intertwined organization and a 1:1 aspect ratio for the sets of flow passages.

Referring now to FIG. 9, another schematic view of the first and second sets of flow passages 58, 78 illustrates the sizing and spacing as defined by the lattice cell body 44. Each of the first and second sets of flow passages 58, 78 includes alternating first and second sets of furcated flow passages 62, 80 between alternating first and second interconnecting passages 70, 82. As illustrated, the first and second sets of furcated flow passages 62, 80 can defined a cross-sectional area that is about or equal to twice the area of the first and second interconnecting passages 70, 82. With the alternative areas of first and second sets of furcated flow passages 62, 80 and first and second interconnecting passages 70, 82, an aspect ratio of or about 1:1 can be defined for the first and second sets of flow passage 58, 78 at any given cross section through the lattice cell body 44 orthogonal to mean flow directions of the first or second sets of flow passages 58, 78. It should be appreciated that the aspect ratio of 1:1 is non-limiting, and that any aspect ratio for the first and second flow passages 58, 78 defined by the lattice cell body 44 is contemplated.

The first set of flow passages 58 can provide a flow path for passing a hot fluid and the second set of flow passages 78 can provide a separate, fluidly isolated second flow path for passing a cold fluid. During passing of the hot and cold flows, heat can transfer through the common wall between the first and second flow passages formed by the lattice cell body 44. As such, the heat exchanger 14 can operate to dissipate heat from a hot fluid provided through the first set of flow passages. While described as a hot fluid and a cold fluid, it should be understood that no particular temperature is required, only that the hot fluid has a temperature greater than that of the cold fluid. Furthermore, the hot fluid is not limited to the first set of flow passages 58 and the cold fluid is not limited to the second set of flow passages 78. Any flow can be passed through any set of passages as is desirable to the heat exchanger. Furthermore, the material forming the lattice cell body 44 can be adapted to facilitate heat transfer, such as a thermally conductive material.

The intertwined first and second flow passage 58, 78 for the heat exchanger 14 are formed as periodic flow passages, that alternate between the first and second sets of furcated flow passages 62, 80 and the first and second interconnecting passages 70, 82. The transitioning first and second flow passages 58, 78 between the furcated flow passage 62, 80 and the interconnecting passages 70, 82 forms a hyperbolic shape, as the alternative first and second sets of furcated flow passages 62, 80 for the first or second flow passages 58, 78 define planes that are orthogonal to one another. The orthogonal, hyperbolic geometry for the first and second flow passages 58, 78 enable intertwining of the two, with one of the first or second flow passages 58, 78 rotated forty-five degrees and offset relative to the other.

The heat exchanger assembly 14 including the lattice cell body 44 provides for improved heat transfer within the heat exchanger. The hyperbolic shape of the first and second sets of flow passages 58, 78 defined by the first and second sets of furcated flow passages 62, 80 provides for a very small length-to-diameter ratio before requiring the passages to turn or converge. The small ratio minimizes pressure drop along the first and second flow passages 58, 78. Furthermore, the hyperbolic saddle points 72 provide for gradual flow direction changes, as opposed to sudden direction changes to improve heat transfer while minimizing pressure losses. Additionally, the latticed or quasi-latticed structure of the heat exchanger minimizes the consequences of maldistribution through the heat exchanger by fully mixing the opposing flow paths of the sets of first and second flow passages 58, 78 with the intertwined geometry, while remaining fluidly isolated. Similarly, the non-linear, complex geometry of the hyperbolic, furcated first and second flow passages 58, 78 provides for an increased effective length, by as much as 50% or more. The increased effective length provides for improved heat transfer within the heat exchanger, resulting in improved efficiency. Further still, the hyperbolic, furcated, and intertwined geometry provides for greater heat transfer coefficients along the first and second sets of flow passages 58, 78. Therefore, efficiency of the heat exchanger is improved, while minimizing pressure losses and improving the heat transfer coefficients within the heat exchanger.

The heat exchanger 14 also provides for improved manufacturability. The heat exchanger can be manufactured by additive manufacturing, such as 3D printing including direct metal laser melting or direct metal laser sintering in non-limiting examples. The complex latticed or quasi-latticed geometry as described can be modeled as basic 2-by-2-by-2 blocked-structures. The blocked-structures can be quickly and accurately manufactured by additive manufacturing. Furthermore, the blocked-structures can be patterned to be as large or small as is required by the particular heat exchanger assembly. Such patterns can include 3-by-3-by-3 or 8-by-8-by-8 in two non-limiting examples. Similarly, the non-horizontal orientation of the passages can provide for effective powder evacuation during additive manufacture as well as maximize build quality and minimize surface roughness.

The heat exchanger 14 further provides for improved strength. The latticed or quasi-latticed structure provides for improved strength within the heat exchanger. The multiple sets of furcated flow passages 62, 80 with the orthogonal orientation provides for improved structural integrity for the heat exchanger.

Figure 10:
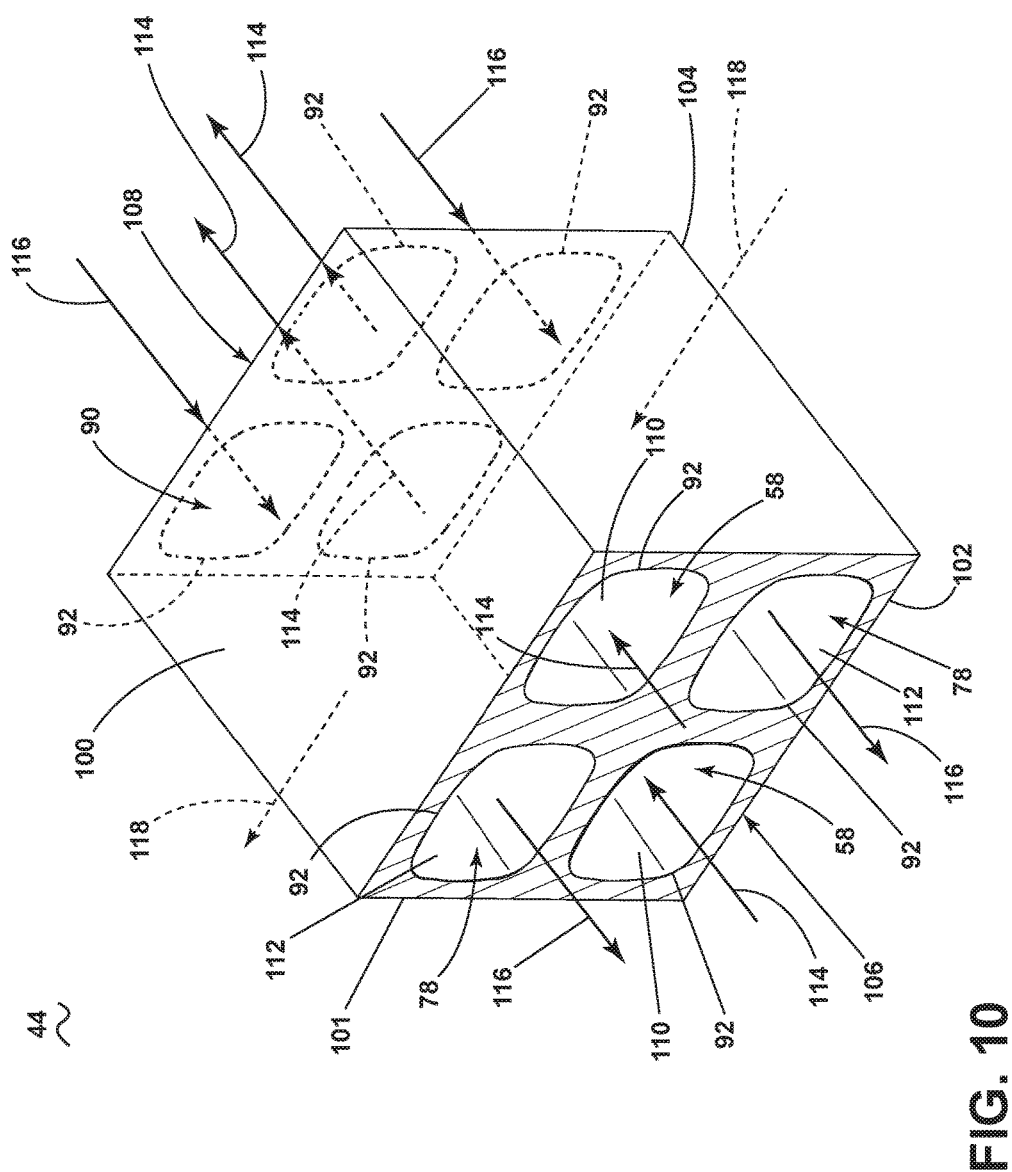
FIG. 10 is another view of the portion of the lattice cell body of FIG. 7 having the sides, top, and bottom enclosed, illustrating a flow path through the conduits.

Referring now to FIG. 10, the portion 90 of the lattice cell body 44 is illustrated having a top 100, a bottom 102, and sides 104 enclosed with a first end 106 and a second end 108 having the openings 92. The second end 108 is illustrated in dashed line, hidden by the sides 104 and top 100 as shown.

The first flow passage 58 can include two inlets 110 and the second flow passage 78 can include two outlets 112, separated from one another by the lattice cell body 44. The first flow passage 58 having the inlets 110 can define a first flow direction 114, while the second flow passage 78 having the outlets 112 can define a second flow direction 116 opposite of the first flow direction 114. The opposing flows 114, 116 can define a counter-flow through the heat exchanger 14. While illustrated as having a counter-flow organization, the structure of the heat exchanger 14, the lattice cell body 44, or the organization of the first and second sets of flow passages 58, 78 can define flow paths in any direction, and having the top 100, bottom 102, or sides 104, or lack thereof in any organization to define flows differing from that as shown. In an alternative example, some of the openings can be formed on the sides 104. A third flow direction 118 passing through the sides 104 can be in a direction defining a crossflow relative to the flow of one of the first or second flow passages 58, 78. The crossflow of the third flow direction 118 can be in a direction that is substantially orthogonal to the mean flow direction of either of the first or second flow directions 114, 116. In yet another alternative example, the flow directions can travel in the same direction, defining a parallel flow direction.

Figure 11:
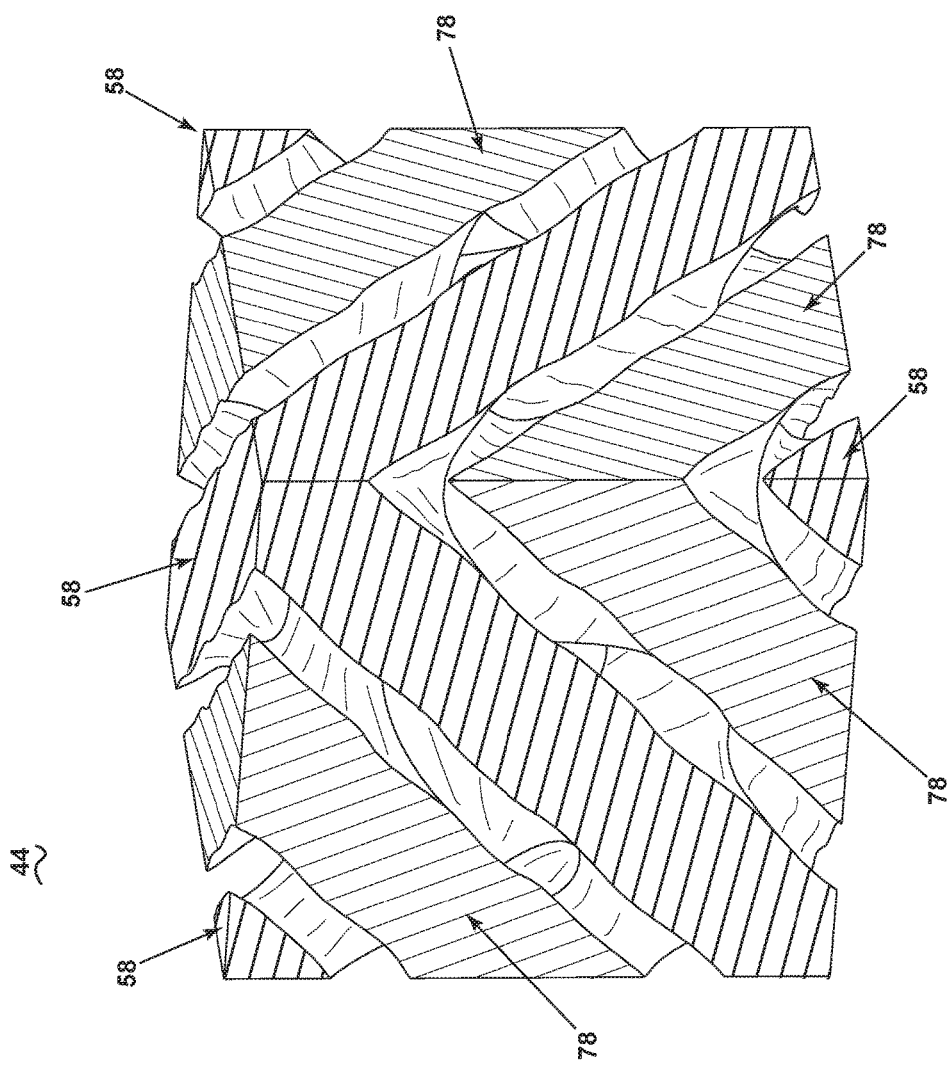
FIG. 11 is an alternative perspective view of the two sets of flow passages of FIG. 7 having a diagonal orientation for the sets of flow passages rotated 45 degrees in accordance with various aspects described herein.

Referring now to FIG. 11, the first and second flow passages 58, 78 can be turned or rotated forty-five degrees, to have a diagonal orientation. While visibly different, the organization of the lattice cell body 44 represented in FIG. 8 is identical to that of FIG. 11, only having the rotational orientation changed, defining rotated flow directions through the first and second flow passages 58, 78. While the geometric configuration is the same, the flow paths are oriented at an angle as opposed to a combination of horizontally or vertically oriented passages as shown in the exploded view of FIG. 7. Furthermore, it should be appreciated that any heat exchanger or any lattice cell body defining any flow passages as described herein can be rotated at a forty-five degree angle to form the diagonal orientation as described. It is further contemplated that any heat exchanger, lattice cell body, or flow passages can be rotated at any angle, and are not limited to a horizontal, vertical, or forty-five degree orientation.

Figure 12:
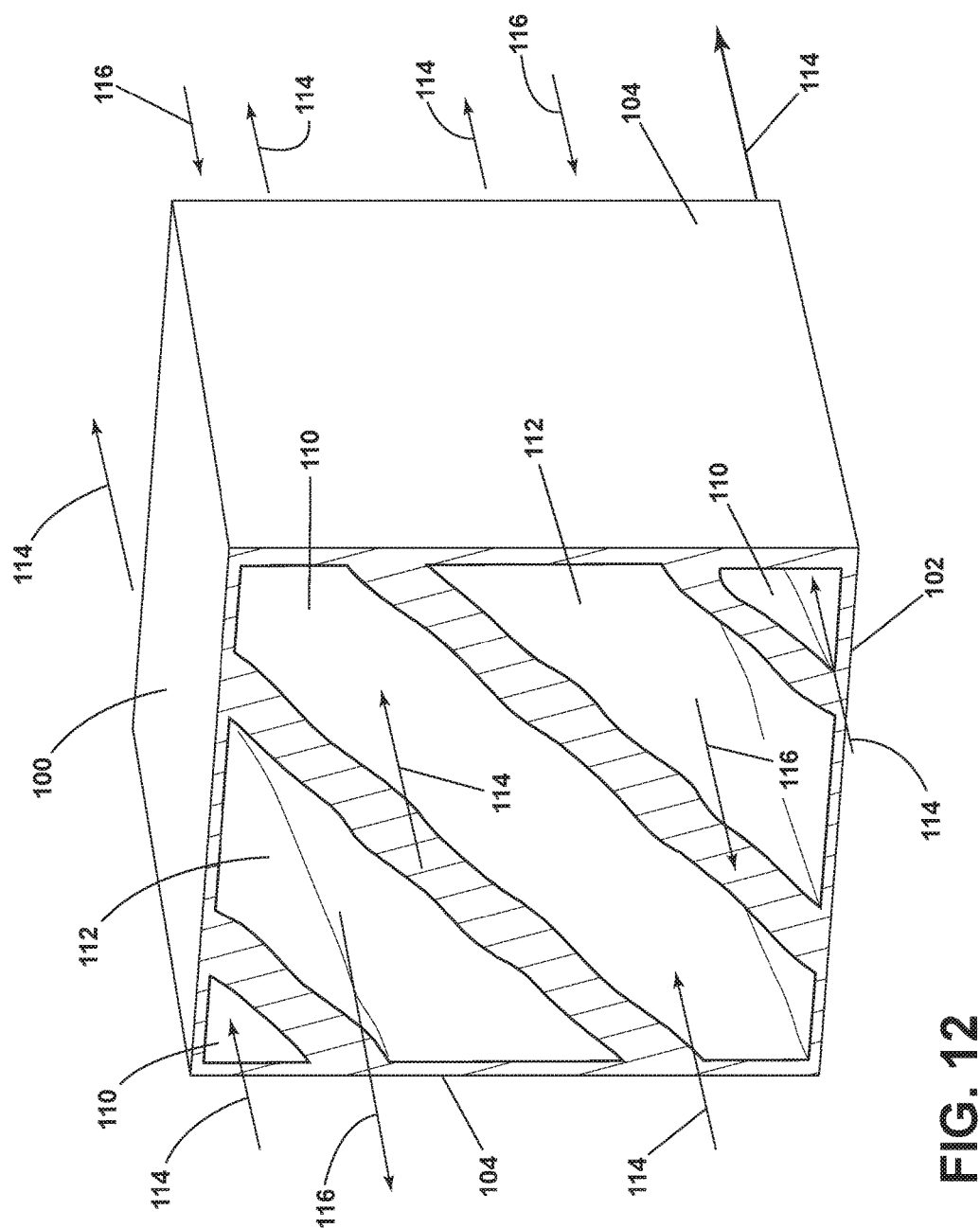
FIG. 12 is a schematic view of the sets of flow passages of FIG. 11 having the sides, top, and bottom enclosed, and illustrating enlarged inlets and outlets and a flow path through the sets of flow passages.

Referring now to FIG. 12, the lattice cell body 44 is oriented in the diagonal orientation of FIG. 11 having the top 100, bottom 102, and sides 104 enclosed. The diagonally-oriented lattice cell body 44 can define enlarged inlets 110 and outlets 112. As is appreciable, the inlets 110 and outlets 112 can extend along the length of lattice cell body 44 in the diagonal orientation, defining the first flow direction 114 and the second flow direction 116 in a direction opposite of the first flow direction 114. The enlarged inlets 110 and outlets 112 can be utilized to adapt flow rates through the heat exchanger 14. Furthermore, enlarged inlets 110 and outlets 112 can provide for less complexity for interconnecting the heat exchanger 14 at the manifolds 26, 28, 34, 36 of FIG. 2.

It should be appreciated that an angled orientation of the heat exchanger 14 can provide for tailoring the inlets 110 and the outlets 112. The particular angled orientation can be varied and tailored to adapted the inlets 110 and the outlets 112 as is desirable for the particular heat exchanger. Such variations can be utilized to adapt flow rates for the heat exchanger.

Figure 13:
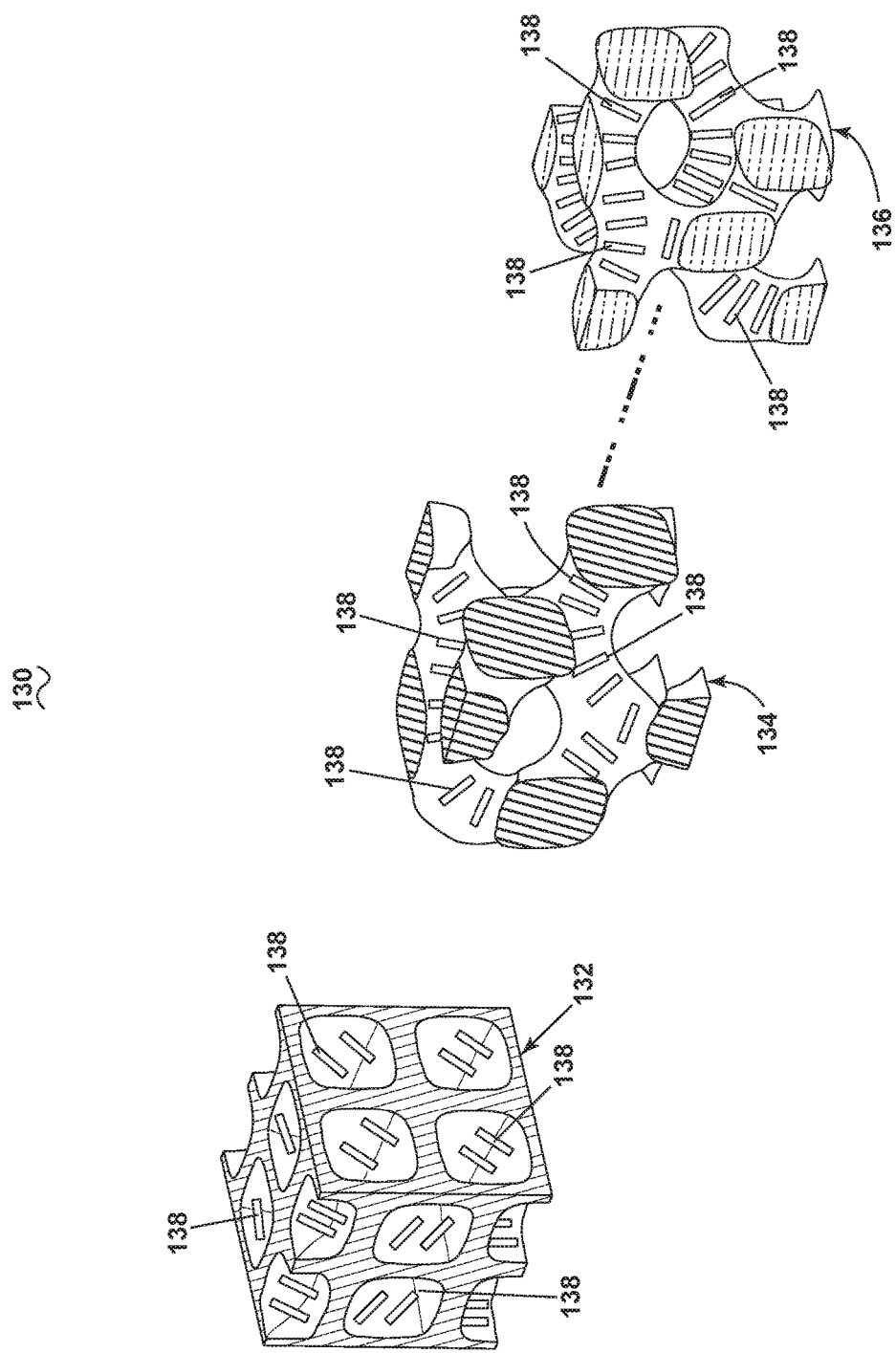
FIG. 13 is an exploded view of another exemplary lattice cell body having flow augmentation structures formed in the lattice cell body in accordance with various aspects described herein.

Referring to FIG. 13, an alternative exemplary heat exchanger 130 can include a lattice cell body 132 to define a first flow passage 134 and a second flow passage 136. The lattice cell body 132 can include one or more flow augmentation structures 138 formed in the lattice cell body 132. The flow augmentation structures 138 can be positive elements that extend from the lattice cell body 132 into the first or second flow passages 134, 136 such as turbulators, in one non-limiting example. Alternatively, any flow augmentation structures can be utilized, such as bumps, ribs, or chevrons in additional non-limiting examples. Furthermore, the flow augmentation structures 138 can be negative structures that are formed into the lattice cell body 132, creating effective flow enhancement areas defined as part of the first or second flow passages 134, 136. Such negative structures can be any shape, similar to that of the positive structures 138 and can by way of non-limiting example include a divot.

The flow augmentation structures 138 as described herein provide for locally affecting a flow passing through one or more of the first or second flow passages 134, 136. The flow augmentation structures 138 provide for increasing the local heat transfer coefficient within the first or second flow passages 134, 136 by affecting the flow. The flow augmentation structures 138 can be patterned about the lattice cell body 132, improving the heat transfer coefficient through the entire heat exchanger assembly 130. Additionally, the flow augmentation structures 138 can be positioned to maximize the heat transfer coefficient of the heat exchanger assembly 130 while minimizing pressure losses along the first or second flow passage 134, 136. For example, the flow augmentation structures 138 can be limited to furcated portions of the first and second flow passages 134, 136, while absent from interconnecting passages or saddle points in order to minimize pressure losses at junctions within the first and second flow passages 134, 136. Alternatively, the flow augmentation structures 138 can be positioned at interconnecting passages where flow velocities may increase, to improve effectiveness of the flow augmentation structures 138, while minimizing additional mass.

Figure 14:
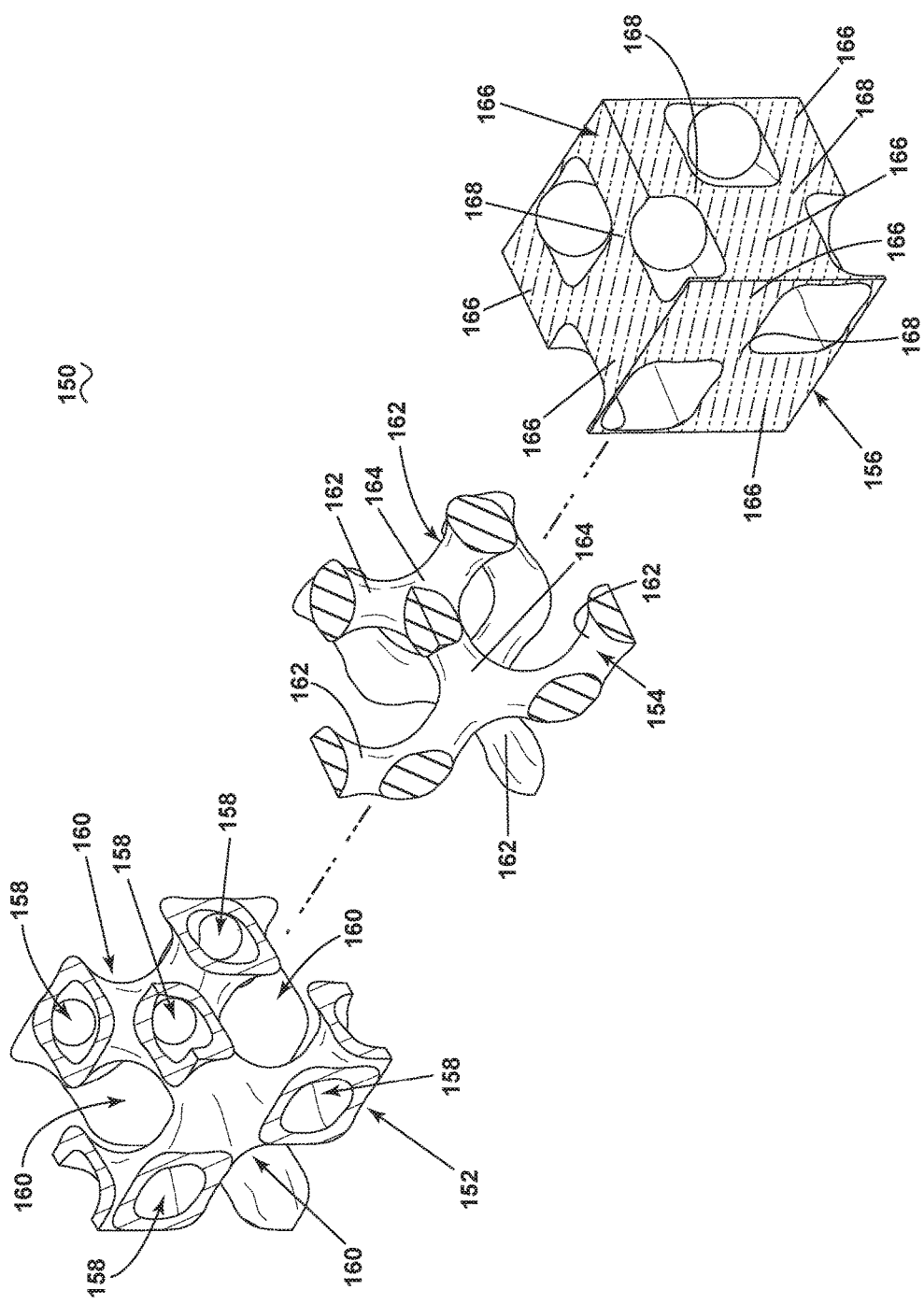
FIG. 14 is an exploded view of another exemplary lattice cell body having exploded solid representations of sets of flow passages having a 1:2 aspect ratio in accordance with various aspects described herein.

Referring to FIG. 14, an exploded view of an alternative exemplary heat exchanger 150 is shown having a lattice cell body 152 exploded from a first set of flow passages 154 and a second set of flow passages 156 defining a 1:2 aspect ratio, with the first and second sets of flow passages 154, 156 shown as solid elements to facilitate understanding of the geometry defined by the lattice cell body 152. The lattice cell body 152 can define a first cavity 158 and a second cavity 160, where the lattice cell body 152 fluidly separates the first cavity 158 from the second cavity 160. The first cavity 158 can define the first set of flow passages 154 while the second cavity 160 can define the second set of flow passages 156.

The first set of flow passages 154 can include one or more sets of first furcated flow passages 162 that interconnect at a first interconnecting passage 164 and can be substantially similar to the first and second sets of flow passages 58, 78 of FIG. 7, having a hyperbolic shape that converges from the first furcated flow passages 162 to the first interconnecting passage 164, and then diverges to another of the first furcated flow passage 162 defining a plane orthogonal to the other furcated flow passages 162 opposite of the first interconnecting passage 164.

The second flow passage 156 can similarly include one or more sets of second furcated flow passages 166 interconnected by second interconnecting passages 168. The shape of the lattice cell body 152 simultaneously separates the first and second flow passages 154, 156 and defines the first and second furcated flow passages 162, 166 that intertwine with one another.

Figure 15:
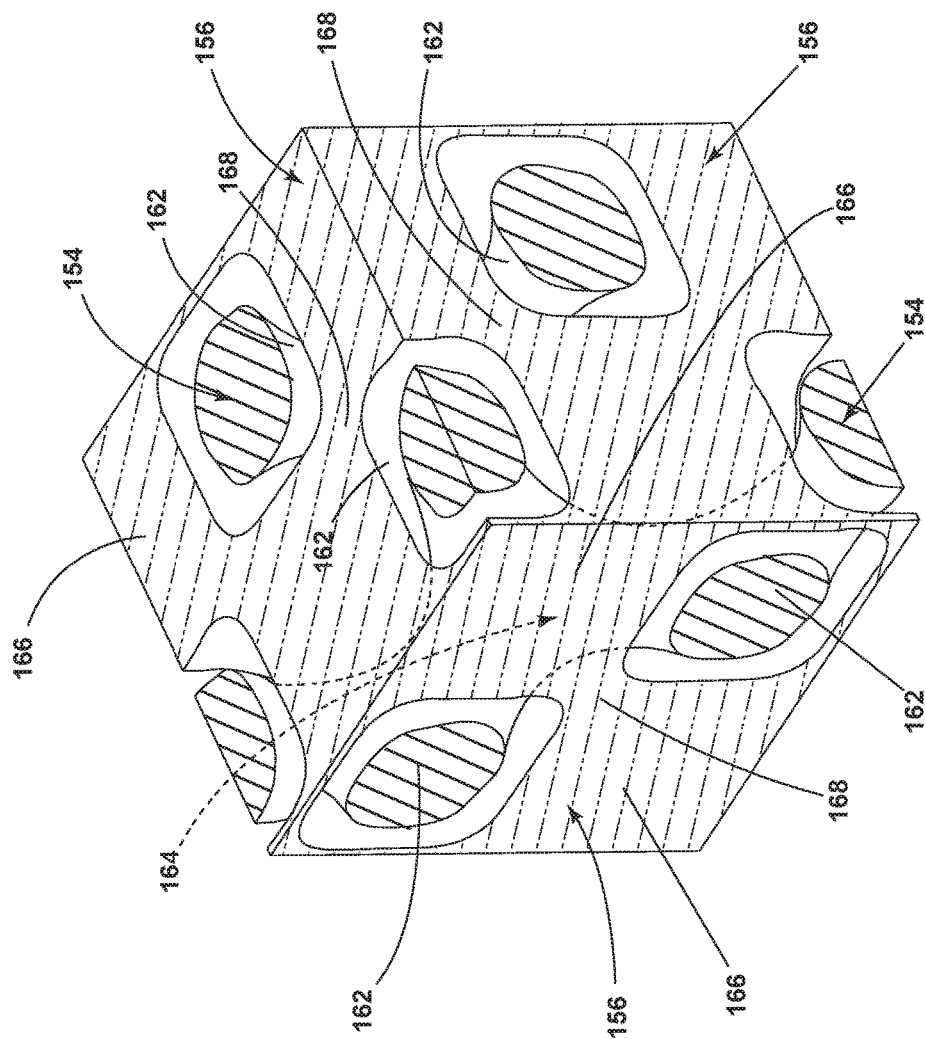
FIG. 15 is a perspective view of the sets of flow passages of FIG. 14 having the lattice cell body removed for clarity.

Referring to FIG. 15, the first set of flow passages 154 is intertwined with the second set of flow passages 156, having the lattice cell body 152 removed for clarity. The first set of furcated flow passages 162 of the first set of flow passages 154 can be positioned around the second interconnecting passage 168 of the second set of flow passage 156 and the second set of furcated flow passages 166 of the second set of flow passages 156 can be positioned around the first interconnecting passage 164 of the first set of flow passage 154, such that the first and second sets of flow passages 154, 156 are intertwined with one another.

Figure 16:
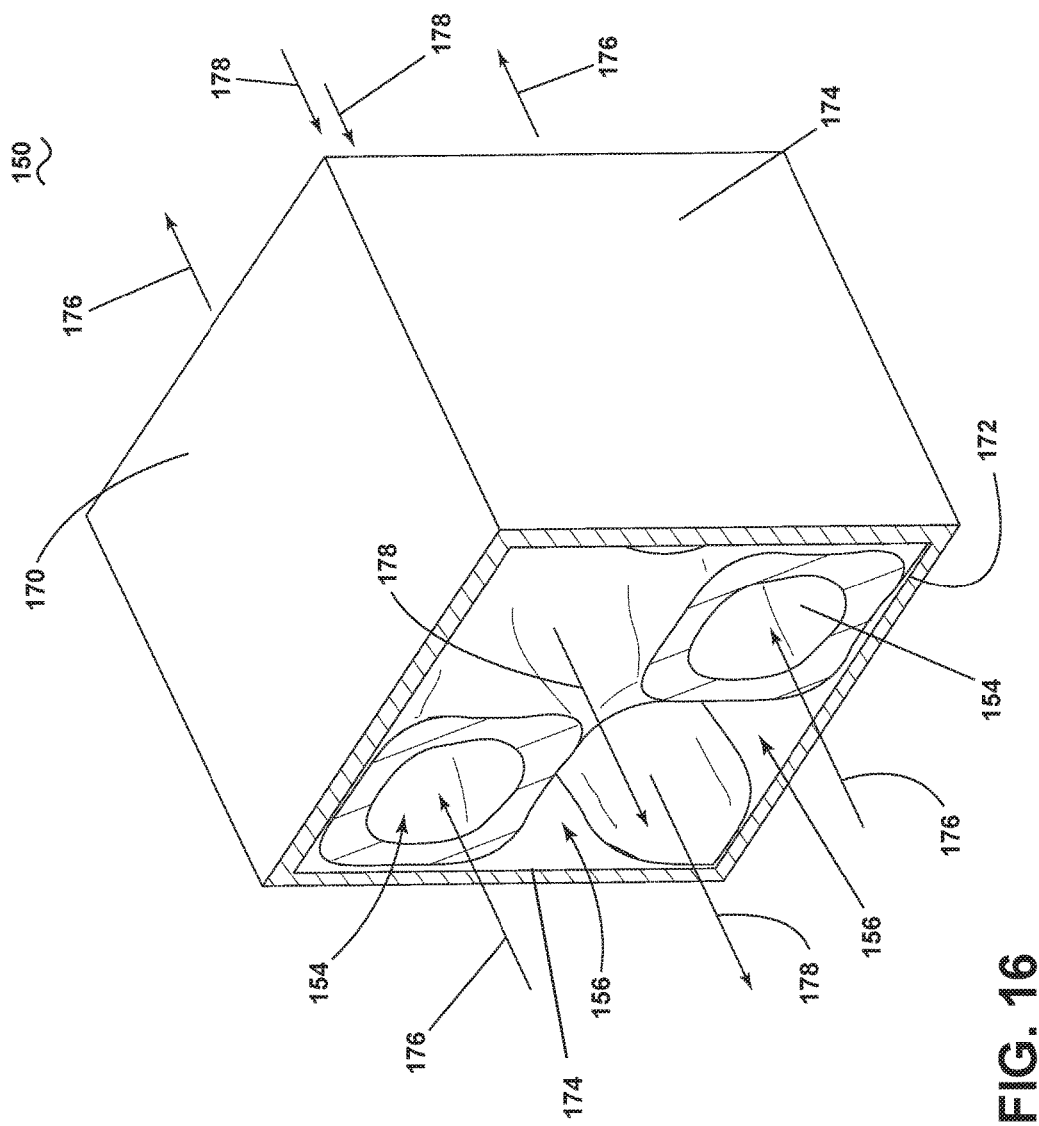
FIG. 16 is a perspective view of portion of the lattice cell body of FIG. 14 having the sides, top, and bottom enclosed, and illustrating inlets and outlets and flow paths through the sets of flow passages.

Referring now to FIG. 16, the portion of the heat exchanger 150 is shown having an exemplary top 170, bottom 172, and sides 174 enclosed, illustrating flow paths through the heat exchanger 150. The first flow passage 154 can define a first flow direction 176 while the second flow passage 156 can define a second flow direction 178. The first flow direction 176 and the second flow direction 178 can be provided in opposite directions as counter-flow. While illustrated as having a counter-flow organization, the structure of the heat exchanger 150, the lattice cell body 152, or the organization of the sets of flow passages can define flow paths in any direction, and having the top 170, bottom 172, or sides 174, or lack thereof in any organization to define flows in directions differing from that as shown. In one example, the flow directions can be organized such that the first and second flow direction 176, 178 are crossflows travelling substantially orthogonal to one another or are parallel, travelling in the substantially same direction.

The volume that is occupied by the first set of flow passages 154 can be half of the volume occupied by the second flow passage 156, such that there is an aspect ratio of 1:2 for the first set of flow passages 154 to the second set of flow passage 156. The aspect ratio of 1:2 for the first flow passage 154 to the second flow passage 156 provides for tailoring the flow through the heat exchanger 150 based upon the particular needs. In a first example, the flow rate can also be 1:2 for the first flow passage 154 to the second flow passage 156. As such, the flow velocities could be similar through the first and second flow passages 154, 156. Alternatively, the flow rate could be 1:1, requiring the flow velocity through the first flow passage 154 to be twice that of the second flow passage 156. Thus, it should be appreciated that the lattice cell bodies as described herein can have aspect ratios tailored to particular anticipated flow rates in order to maximize efficiency of the heat exchanger. Furthermore, the flow rates could be increased during heightened operation, while the flow rates could be decreased during typical operations, such as during take-off and idle for an aircraft, respectively.

Figure 17:
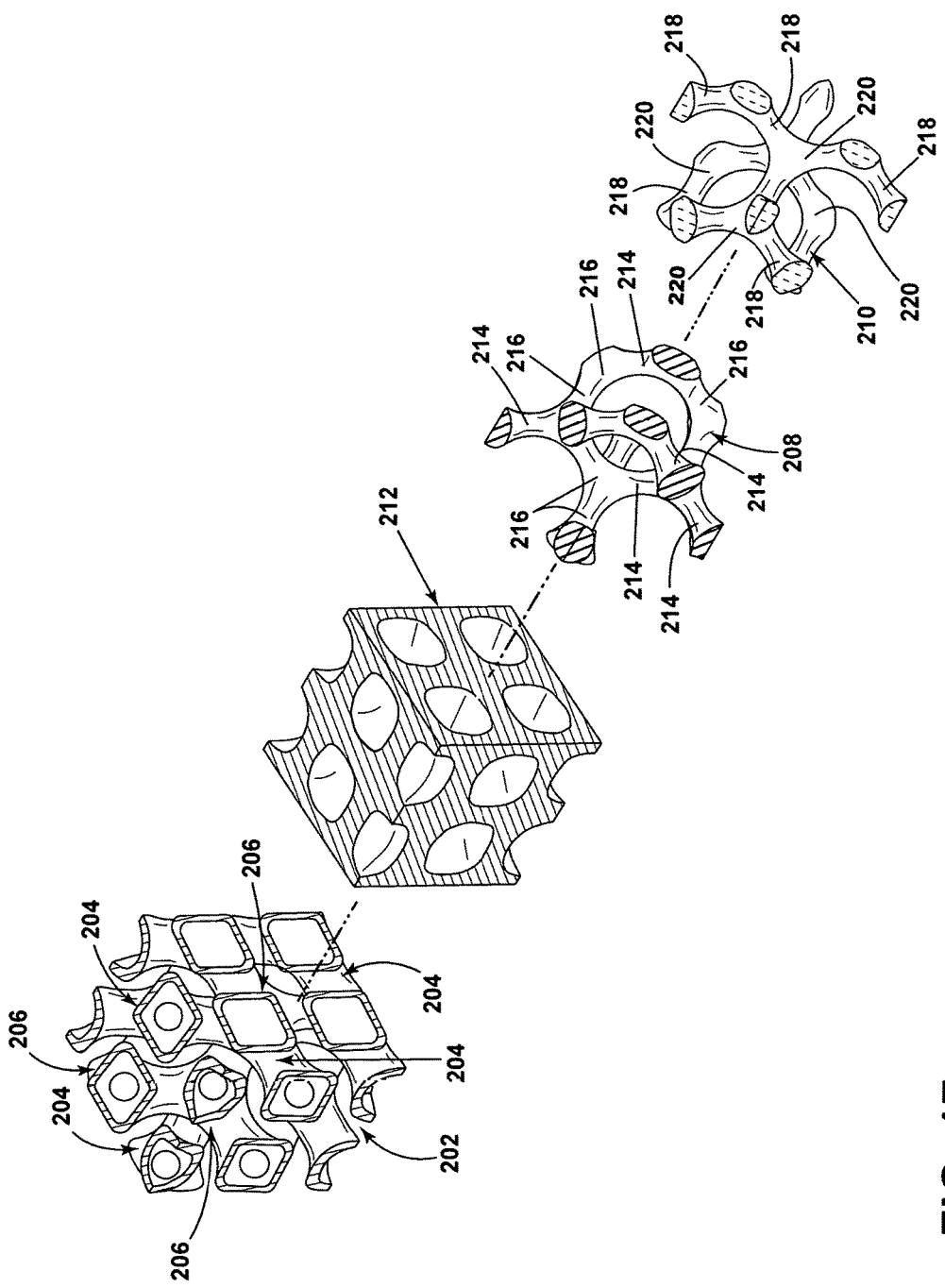
FIG. 17 is an exploded view of another exemplary lattice cell body having two lattice cell portions to define first and second sets of flow passages, and spaced to define a third set of flow passages between the two lattice cell portions in accordance with various aspects described herein.

Referring now to FIG. 17, an exploded view of another exemplary heat exchanger 200 includes a lattice cell body 202 having a first portion 204 and a second portion 206. A first set of flow passages 208 is defined by the first portion 204, a second set of flow passages 210 is defined by the second portion 206, and a third set of flow passages 212 is defined between the first portion 204 and the second portion 206. The first, second, and third sets of flow passages 208, 210, 212 are illustrated as exploded solid elements to facilitate understanding of the shapes of the flow passages defined by the lattice cell body 202. The first set of flow passages 208 can include a set of first furcated flow passages 214 interconnected at one or more first interconnecting passages 216 and the second set of flow passages 210 can include a second set of furcated flow passages 218 interconnected by one or more second interconnecting passages 220. The first and second sets of flow passages 208, 210 can have hyperbolic shapes, defined by converging and diverging sets of furcated flow passages 214, 218 at the interconnecting passages 216, 220 oriented orthogonal to one another, similar to that of FIG. 7, and intertwined with one another.

The first portion 204 of the lattice cell body 202 is spaced from the second portion 206 of the lattice cell body 202 to define the third set of flow passages 212 between the first and second portions 204, 206. The third flow passage 212 is formed throughout the heat exchanger 200 defined by the intertwined first and second sets of flow passages 208, 210. The third flow passage 212 effectively has two heat transfer surfaces and is comparable to a multi-annular pipe, but implemented in a latticed or quasi-latticed geometry in the present example. In addition, the third flow passage 212 can have a constant distance between wall surfaces, while variable distances are contemplated. The wall surfaces also do not need to be parallel and may contain surface enhancement features, similar to that of FIG. 13. Lastly, the first and second flow passages 208, 210 can provide for the flow of a first fluid while the third flow passage provides a second fluid, while it is contemplated that all three passages provide different fluids to maximize heat exchanger effectiveness. These same can apply to any lattice containing two or more portions, and should not be limited by the number of unique fluids supplied to the heat exchanger as the same fluid may be used in multiple flow paths.

Figure 18:
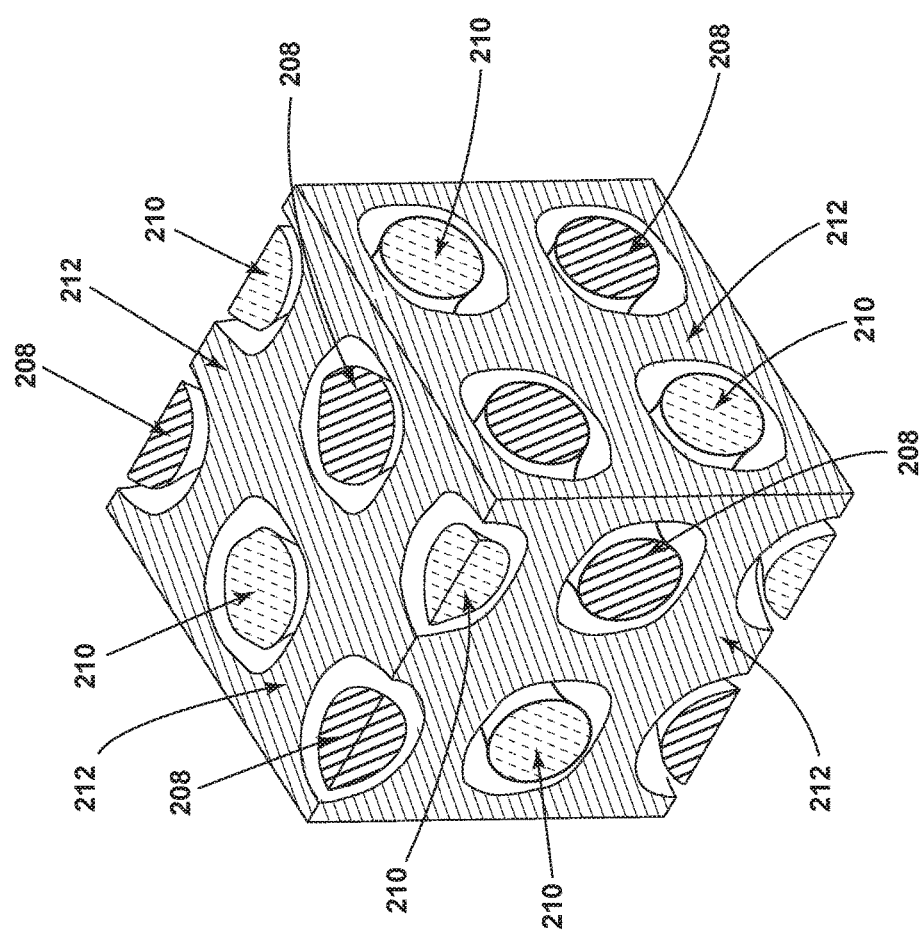
FIG. 18 is a perspective view illustrating of the sets of flow passages of FIG. 17 having the lattice cell body removed for clarity.

Referring to FIG. 18, the first set of flow passages 208, the second set of flow passages 210, and the third set of flow passages 212 are illustrated intertwined with one another, having the lattice cell body 202 removed for clarity. The first and second flow passages 208, 210 can be similar, occupying the same volume as each other. The third set of flow passages 212 can have an increased volume relative to the first and second sets of flow passages 208, 210, such that the aspect ratio for the three passages is 1:1:2 for the first, second, and third sets of flow passages 208, 210, 212, respectively. However, it should be understood that the respective sizes of the first, second, and third sets of flow passages 208, 210, 212 can be modified based upon the particular needs of the heat exchanger 200. In one alternative example, the first, second, and third sets of flow passages 208, 210, 212 can a 1:1:1 aspect ratio. Furthermore, it should be appreciated that any sizing defining any aspect ratio is contemplated, while the first portion 204 of the lattice cell body 202 is separated from the second portion 206 of the lattice cell body 202 to define the third flow passage 212.

Figure 19:
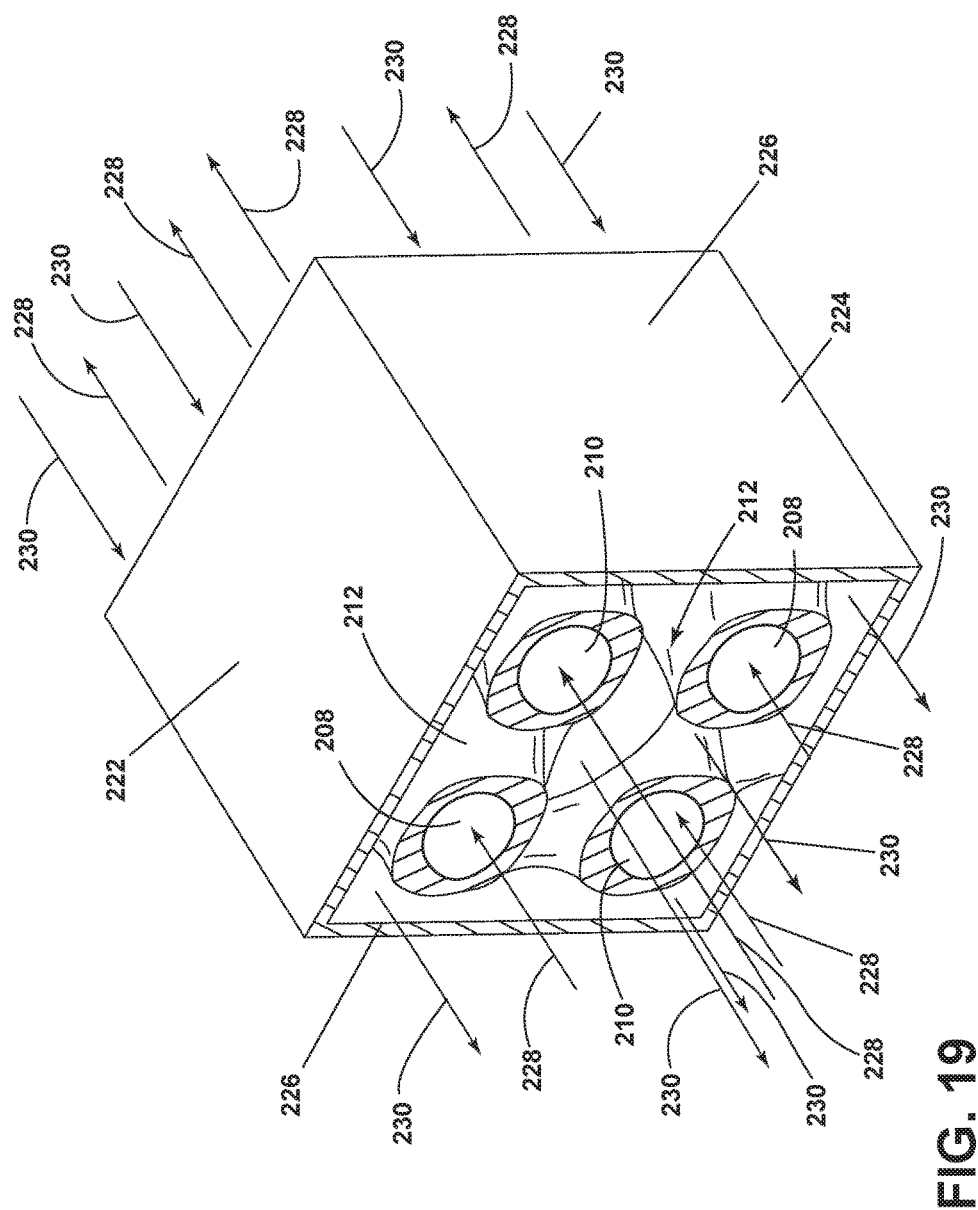
FIG. 19 is a perspective view of the sets of flow passages and the lattice cell body portions having the sides, top, and bottom enclosed to illustrate flow paths through the sets of flow passages.

Referring to FIG. 19, the heat exchanger 200 is shown having an enclosed top 222, bottom 224, and sides 226. A first flow direction 228 can be defined through the first and second sets of flow passage 208, 210 and a second flow direction 230 can be defined through the third set of flow passage 212 that is opposite of the first flow direction 228 such that a counter-flow is defined through the heat exchanger 200. While illustrated as having a counter-flow organization, the structure of the heat exchanger 200, the lattice cell body 202, or the organization of the sets of flow passages 58, 78 can define flow paths in any direction, and having the top 222, bottom 224, or sides 226, or lack thereof in any organization to define flows differing from that as shown. Alternatively, the second flow direction can be in a direction orthogonal to the first flow direction such that a crossflow is defined through the heat exchanger 200. In yet another example, the flow through the first set of flow passages 208 can be in a direction opposite of the flow through the second flow passage 210, while the flow through the third passage 212 can be orthogonal to both the flows through the first and second passages 208, 210. Therefore, it should be appreciated that multiple flow direction configurations are possible in order to effectively provide a flow through the heat exchanger and to operate the heat exchanger. It should be further appreciated that having multiple flows in opposing directions can improve or tailor the heat transfer coefficients within the heat exchanger 200.

Figure 20:
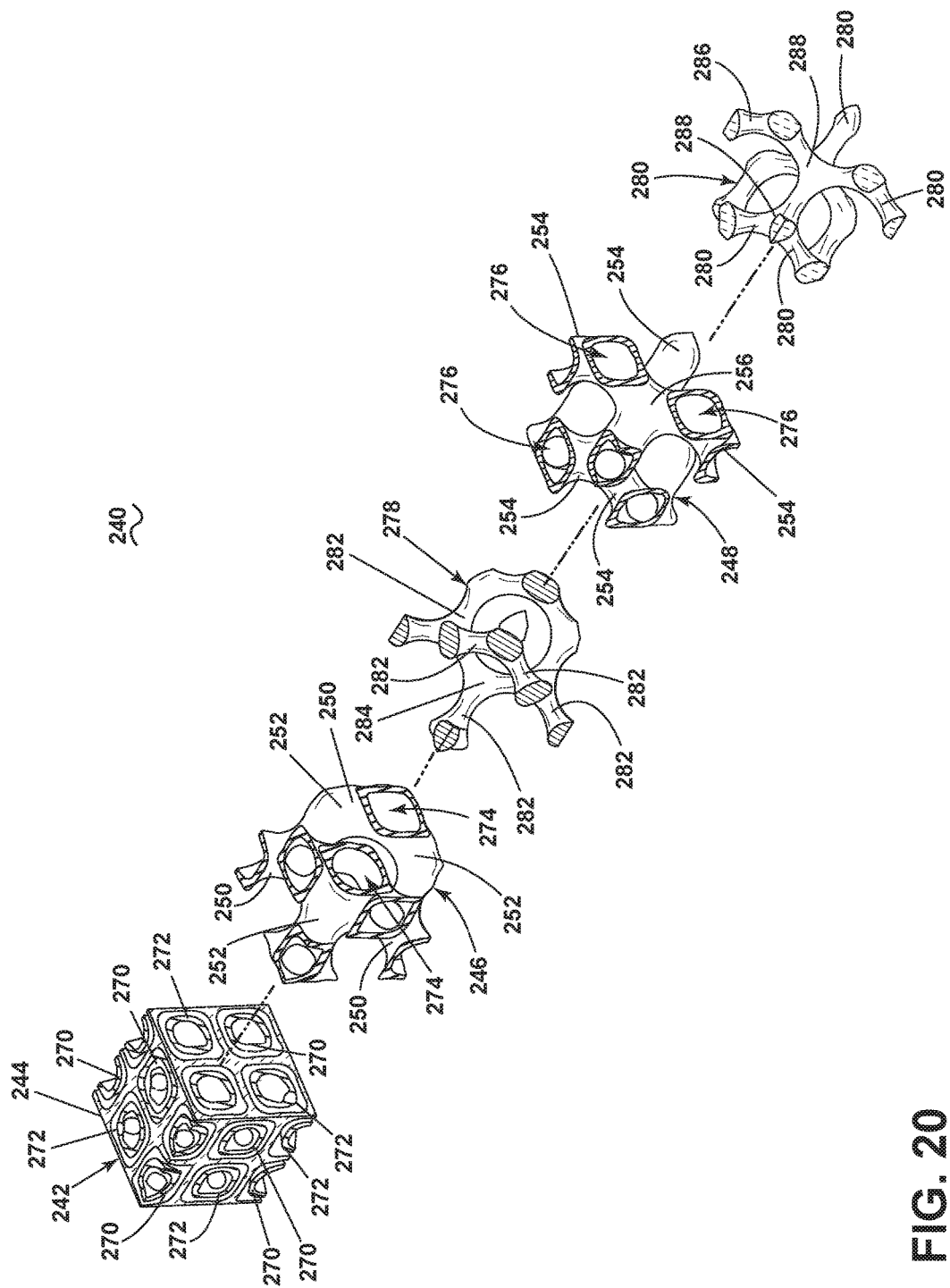
FIG. 20 is an exploded view of another exemplary lattice cell body having a first lattice cell portion to define first and second sets of flow passages, and further including two additional lattice cell portions provided within the first lattice cell portion to define third and fourth sets of flow passages in accordance with various aspects described herein.

Referring now to FIG. 20, another exemplary heat exchanger 240 is illustrated including a lattice cell body 242 that includes a first portion 244. The first portion 244 of the lattice cell body 242 can define a first set of flow passages 246 and a second set of flow passages 248, substantially similar to that of FIG. 7, including the hyperbolic shape and intertwined organization defined by the first portion 244 of the lattice cell body 242. The first set of flow passages 246 and the second set of flow passages 248 are illustrated as exploded solid elements to facilitate understanding of the geometry of the first and second sets of flow passages 246, 248.

A second portion 270 and a third portion 272 can be provided in the first and second flow passages 246, 48 defined by the first portion 244 of the lattice body 242. The second portion 270 can be provided in the first flow passage 246 and the third portion 272 can be provided in the second flow passage 248. A first cavity 274 and a second cavity 276 are defined by the second and third portions 270, 272 to define a third set of flow passages 278 and a fourth set of flow passages 280, respectively. The third and fourth flow passages 278, 280 are also illustrated as exploded solid elements to facilitate understanding of the geometry of the third and fourth flow passage 278, 280. The third flow passage 278 can include one or more sets of third furcated flow passages 282 that converge to a third interconnecting passages 284 and diverge to another set of furcated flow passages 282 oriented orthogonal to the converging set of third furcated flow passages 282. Similarly, the fourth flow passage 280 can include one or more sets of fourth furcated flow passages 286 that converge to a fourth interconnecting passage 288 and then diverge to another set of fourth furcated flow passages 286 oriented orthogonal to the converging set of fourth furcated flow passages 286 to define a hyperbolic shape for the fourth flow passage 280. The third and fourth sets of flow passages 278, 280 intertwine with one another via the organization of the first and second sets of flow passages 246, 248. It should be understood that the first, second, third, and fourth sets of flow passages 246, 248, 278, 280 are fluidly isolated from one another by the first, second, and third portions 244, 270, 272 of the lattice cell body 242.

Figure 21:
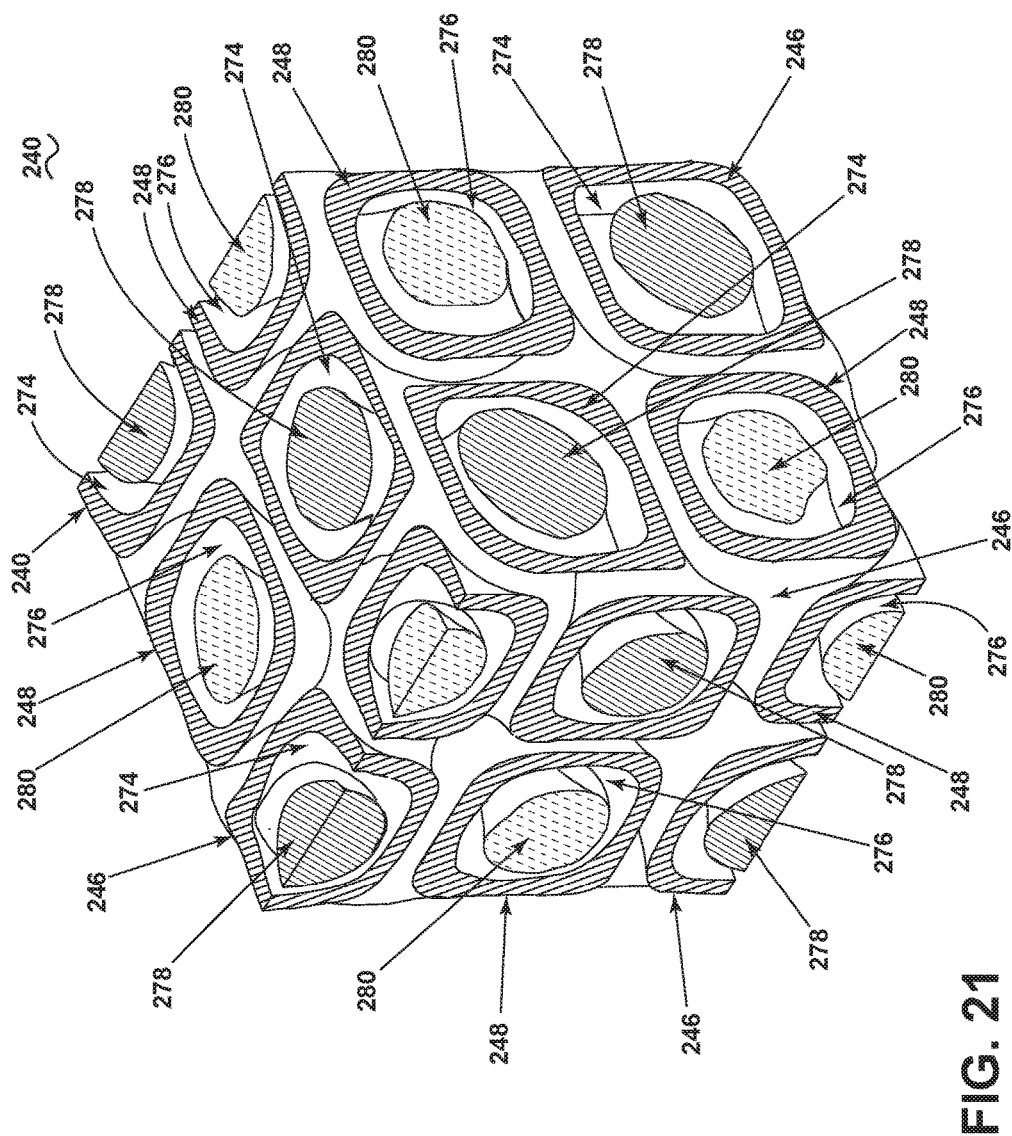
FIG. 21 is a perspective view of the sets of flow passages of FIG. 20 having the lattice cell body removed to clarify the first and second set of flow passage and the third and fourth sets of flow passages.

Referring to FIG. 21, the combined heat exchanger 240 is illustrated having the lattice cell body 242 removed to better illustrate the interconnected flow passages. The first set of flow passages 246 is intertwined with the second set of flow passages 248. The third set of flow passages 278 is provided within the first set of flow passages 246 and the fourth set of flow passages 280 is provided within the second set of flow passage 248. The geometry of the third and fourth sets of flow passages 278, 280 is complementary to the first and second sets of flow passages 246, 248, such that the third and fourth sets of flow passages 278, 280 pass within the interior of first and second set of flow passages 246, 248, respectively, without intersecting another flow passage.

Figure 22:
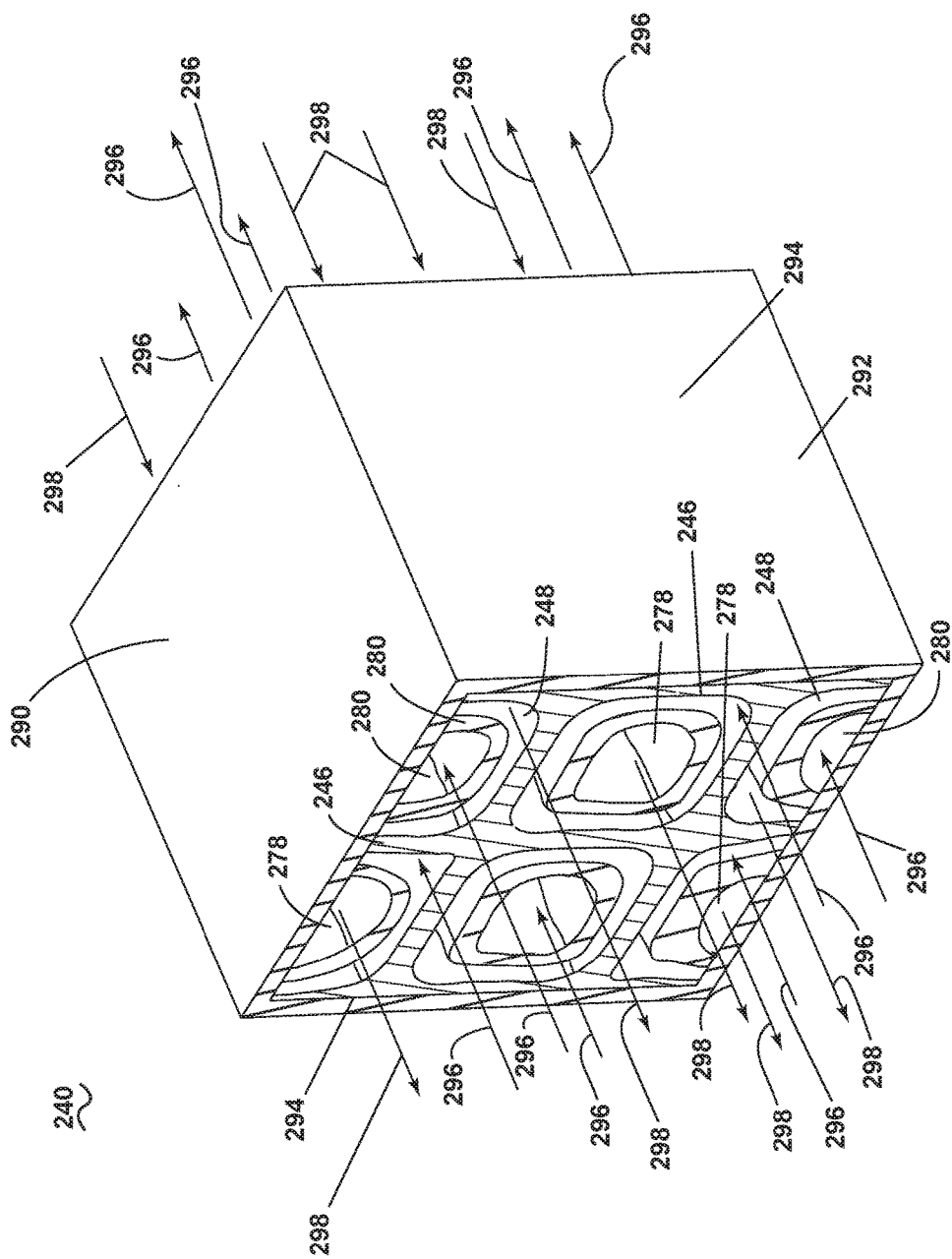
FIG. 22 is a perspective view of the view of the lattice cell body of FIG. 20 having the sides, top, and bottom enclosed to illustrate flow paths through the sets of flow passages.

Referring now to FIG. 22, the heat exchanger 240 is illustrated having an enclosed top 290, bottom 292, and sides 294. A first flow direction 296 can be defined through the first set of flow passages 246 and the fourth set of flow passages 280, and can be substantially parallel to one another. A second flow direction 298 can be defined through the second set of flow passage 248 and the third set of flow passages 278, and can also be substantially parallel to one another. In such an organization, the first and third sets of flow passages 246, 278 can define a counter-flow through one another and the second and fourth sets of flow passages 248, 280 can define a counter-flow through one another. Thus, heat transfer can be maximized with two sets of counter-flows being provided through each of first and second sets of flow passages 246, 248. Furthermore, the flow direction 296, 298 through the first and second sets of flow passages 246, 248 passes in opposing directions as another counter-flow to further improve the efficiency of the heat exchanger 240.

While illustrated as having a counter-flow organization, the structure of the heat exchanger 240, the lattice cell body 242, or the organization sets of flow passages can define flow paths in any direction, and having the top 290, bottom 292, or sides 294, or lack thereof in any organization to define flows differing from that as shown. For example, the flow directions can be in a direction that is orthogonal to one another to define a crossflow. In such an example, the second flow direction can be in a direction through the sides 294, being orthogonal to the first flow direction 296. In yet another example, the flow directions can all be in the same direction as one another. In further examples, it is contemplated that any of the first, second, third, or fourth sets of flow passages 246, 248, 278, 280 can include any flow direction, such that the heat transfer within the heat exchanger 240 is tailored to the needs of the particular implementation, such as tailoring heat transfer or facilitating ingress or egress of a fluid for heat transfer.

Figure 23:
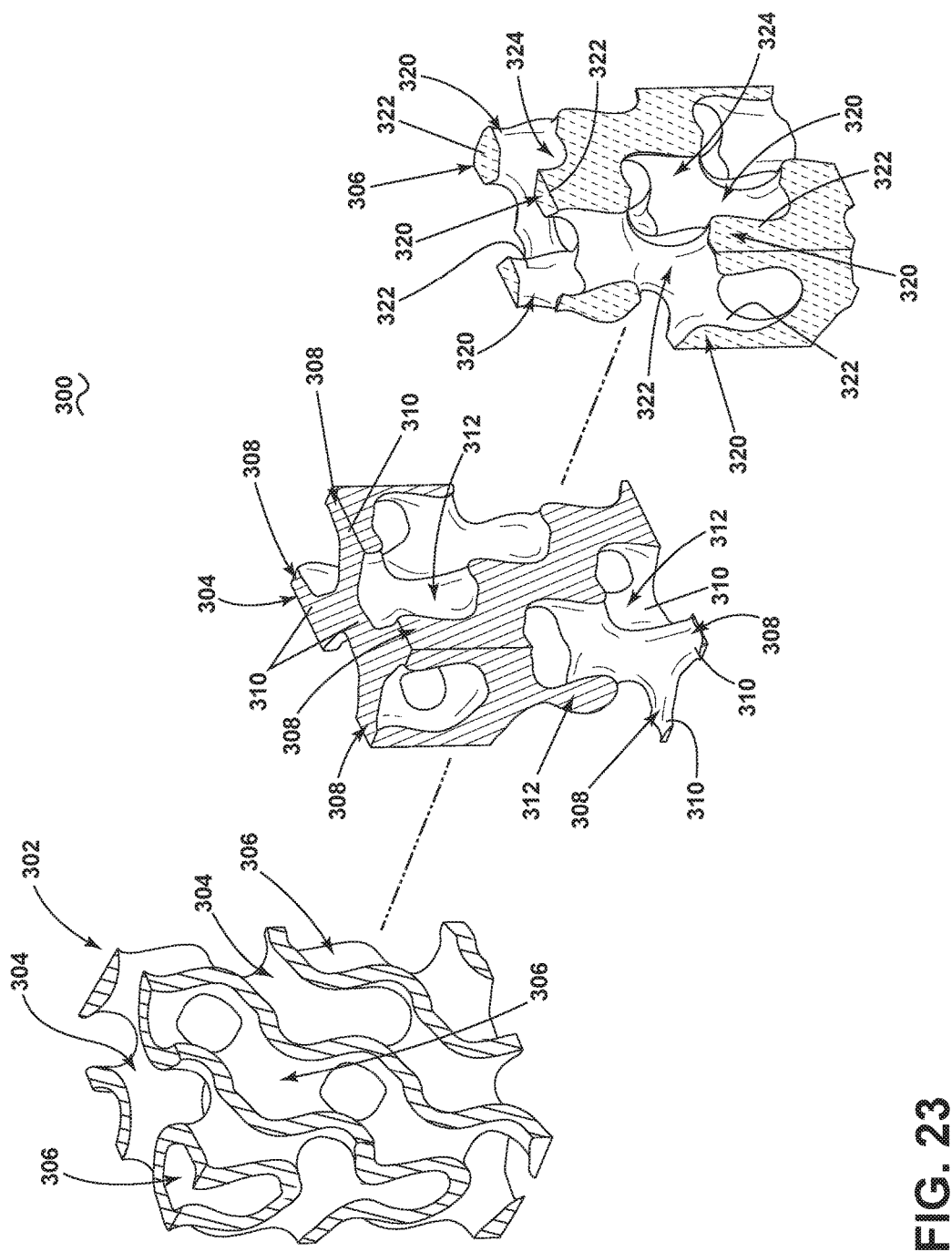
FIG. 23 is an exploded view of another exemplary lattice cell body having two sets of flow passages having furcated flow passages with three branches illustrated as solid elements defined by the lattice cell body in accordance with various aspects described herein.

Referring now to FIG. 23, an exploded view of another alternative heat exchanger 300 is illustrated including a lattice cell body 302 to define a first set of flow passages 304 and a second set of flow passage 306. The first and second sets of flow passages 304, 306 are illustrated as solid elements to facilitate understanding of the geometry of the first and second sets of flow passages 304, 306 formed by the lattice cell body 302. The first set of flow passages 304 includes a first set of furcated flow passages 308 including three branches 310 that converge to a first interconnecting passage 312. The first interconnecting passage 312 diverges to another first set of furcated flow passages 308 having three branches 310

Similarly, the second set of flow passages 306 can include a second set of furcated flow passages 320 including three branches 322 that converge to a second interconnecting passage 324 and then diverge to another second set of furcated flow passages 320 having three branches 322. The converging second set of furcated flow passages 320 can be rotated sixty-degrees relative to the diverging second set of furcated flow passages 320.

Figure 24:
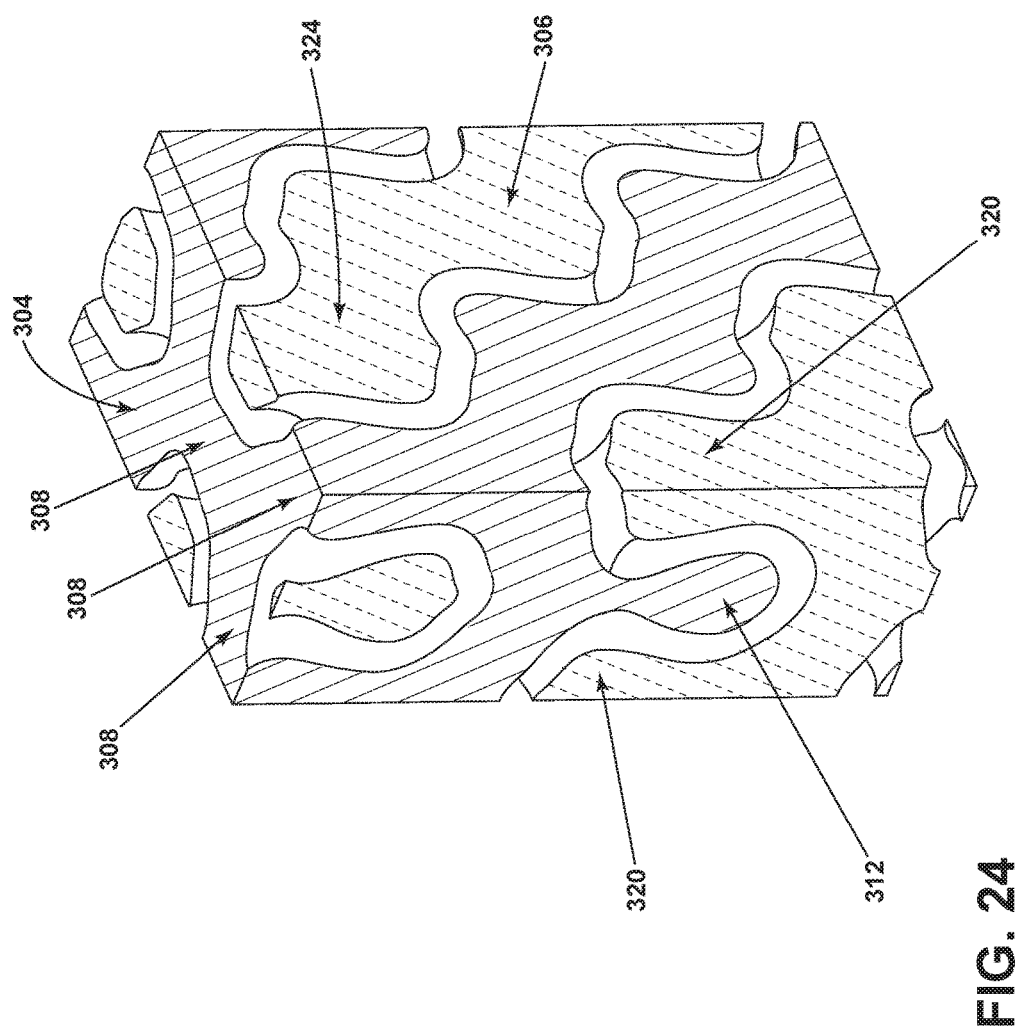
FIG. 24 is perspective view of the two sets of flow passages of FIG. 23 having the lattice cell body removed for clarity.

Referring to FIG. 24, the first and second sets of flow passages 304, 306 are intertwined with one another having the lattice cell body 302 removed for clarity. The first set of furcated flow passages 308 of the first set of flow passages 304 are aligned with the second interconnecting passage 324 of the second set of flow passages 306 and the second set of furcated flow passages 320 of the second set of flow passages 306 are aligned with the first interconnecting passages 312 of the first set of flow passages 304.

Figure 25:
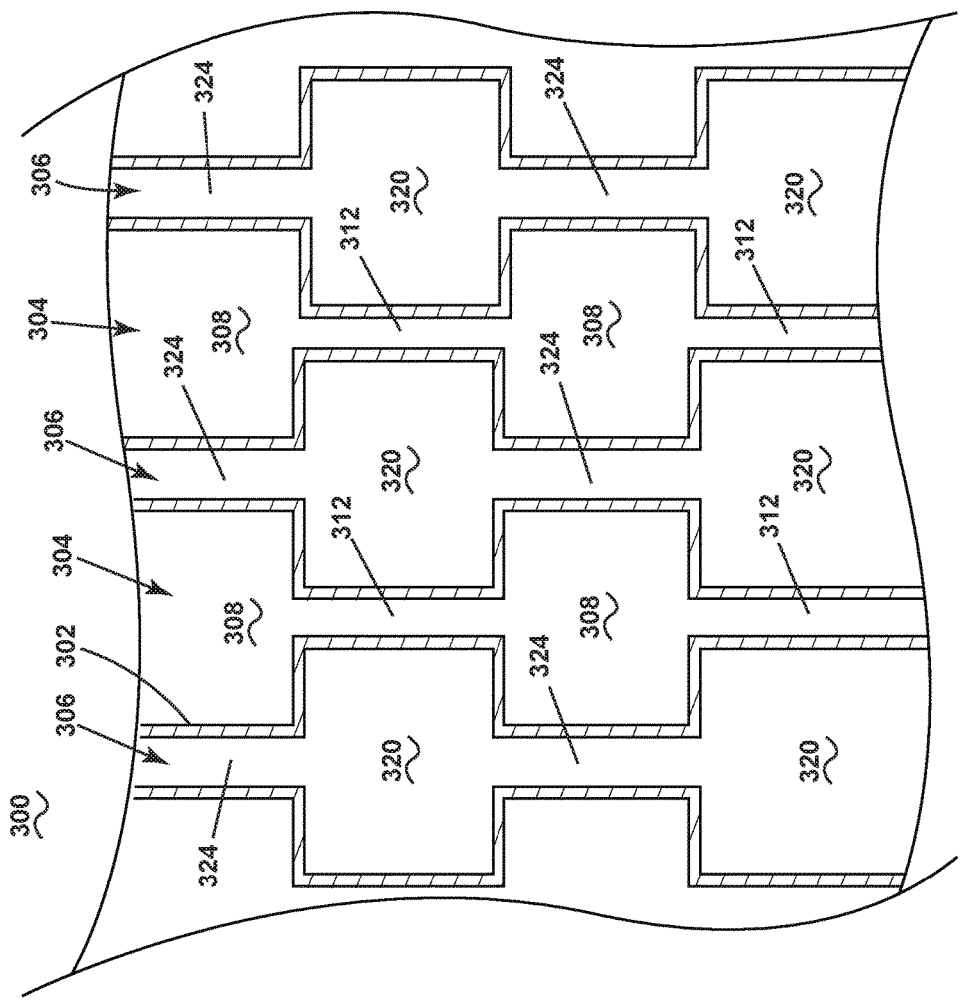
FIG. 25 is a schematic view of the flow pattern defining by the two set of flow passages of FIG. 24 having a 1:1 aspect ratio in accordance with various aspects described herein.

Referring to FIG. 25, a schematic view of the intertwined first and second sets of flow passages 304, 306 better illustrates the interconnected organization defined by the lattice cell body 302. The first set of flow passages 304 includes alternating first set of furcated flow passages 308 and the first interconnecting passages 312, while the second set of flow passages 306 includes the series of alternative second set of furcated flow passages 320 and second interconnecting passages 324. The first set of furcated flow passages 308 align with the second interconnecting passages 324. The smaller volume of the second interconnecting passages 324 provides space for the larger volume of the first set of furcated flow passages 308. Similarly, the smaller volume of the first interconnecting passages 312 provides space for the larger volume of the second set of furcated flow passages 320. This type of arrangement results in alternating layers of larger and smaller passages. As shown, an aspect ratio for the first set of flow passages 304 to the second set of flow passages 306 can be 1:1, while any aspect ratio is contemplated.

Furthermore, it should be appreciated that the branches 310, 322 of the first and second sets of furcated flow passages 308, 320 can diverge to separate first interconnecting passages 312. Further still, each branch 310, 322 can form both a converging portion and a diverging portion of the furcated passages 308, 320, similar to that described in FIG. 5. While FIG. 25 is illustrated in two dimensions, it should be appreciated that the diverging passages can extend into or out of the page to form a three-dimensional latticed or quasi-latticed structure, such as that illustrated in FIG. 24.

Figure 26:
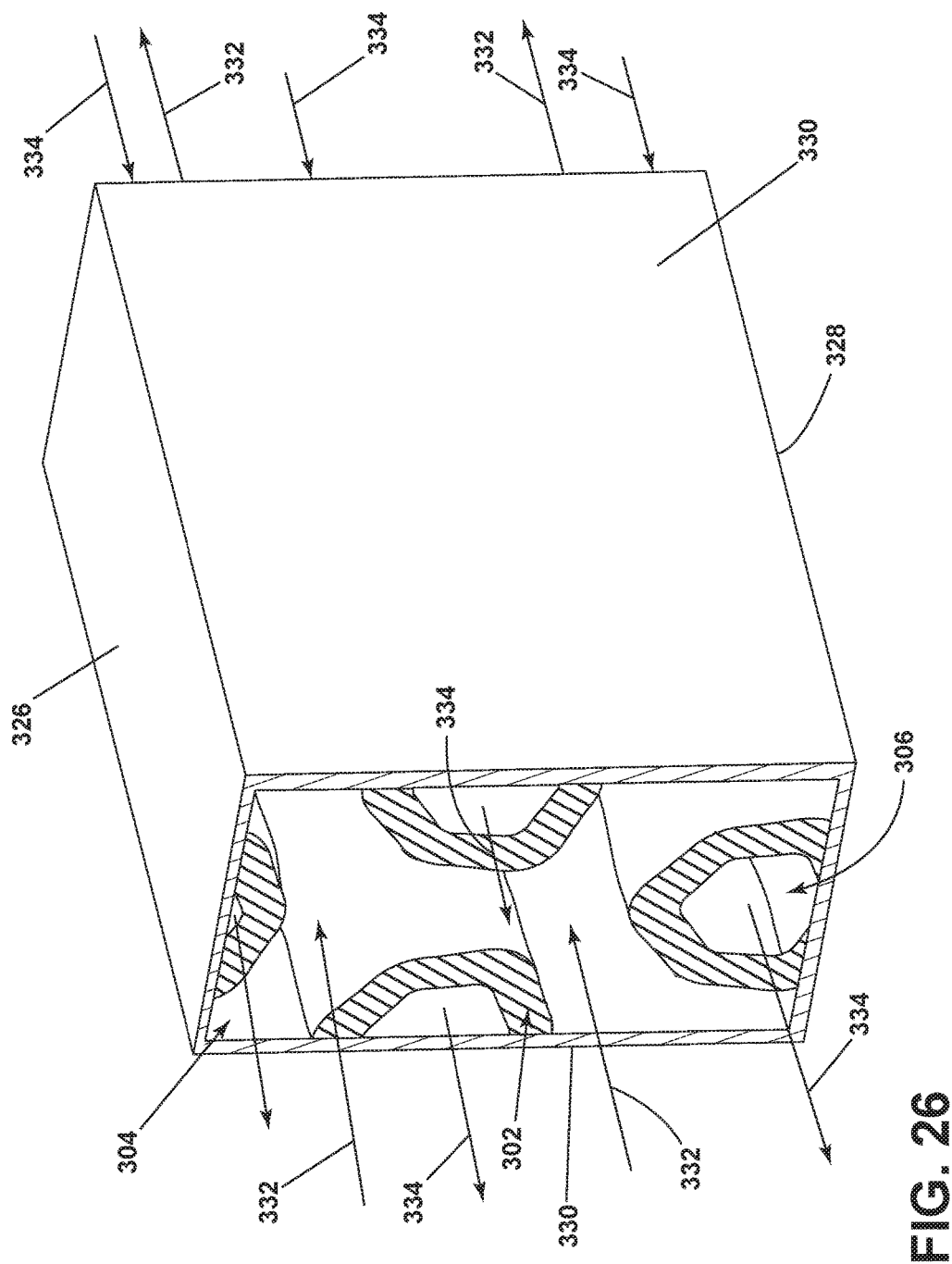
FIG. 26 is a perspective view of the view of the lattice cell body of FIG. 23 having the sides, top, and bottom enclosed to illustrate flow paths through the sets of flow passages.

Referring now to FIG. 26, the first and second sets of flow passages 304, 306 are illustrated within the lattice cell body 302 having a top 326, bottom 328, and sides 330 enclosed and illustrating a first flow direction 332 extending through the first set of flow passages 304 and a second flow direction 334 extending through the second set of flow passages 306 in a direction opposite of the first flow direction 332 to define a counter-flow through the heat exchanger 300. The counter-flow defined by the opposing first and second flow directions 332, 334 can provide for improved heat transfer for the heat exchanger 300. While illustrated as having a counter-flow organization, the structure of the heat exchanger 300, the lattice cell body 302, or the organization sets of flow passages can define flow paths in any direction, and having the top 326, bottom 328, or sides 330, or lack thereof in any organization to define flows differing from that as shown. For example, the flow direction through the lattice structure of the second set of flow passages 306 can be in a direction orthogonal to the flow direction through the first set of flow passages 304 to define a crossflow. In yet another alternative example, the flow directions through the first and second set of flow passages 304, 306 can be in the same direction, or in any combination of directions as is desirable for improving heat transfer while providing for ingress and egress of fluids for heat transfer.

Figure 27:
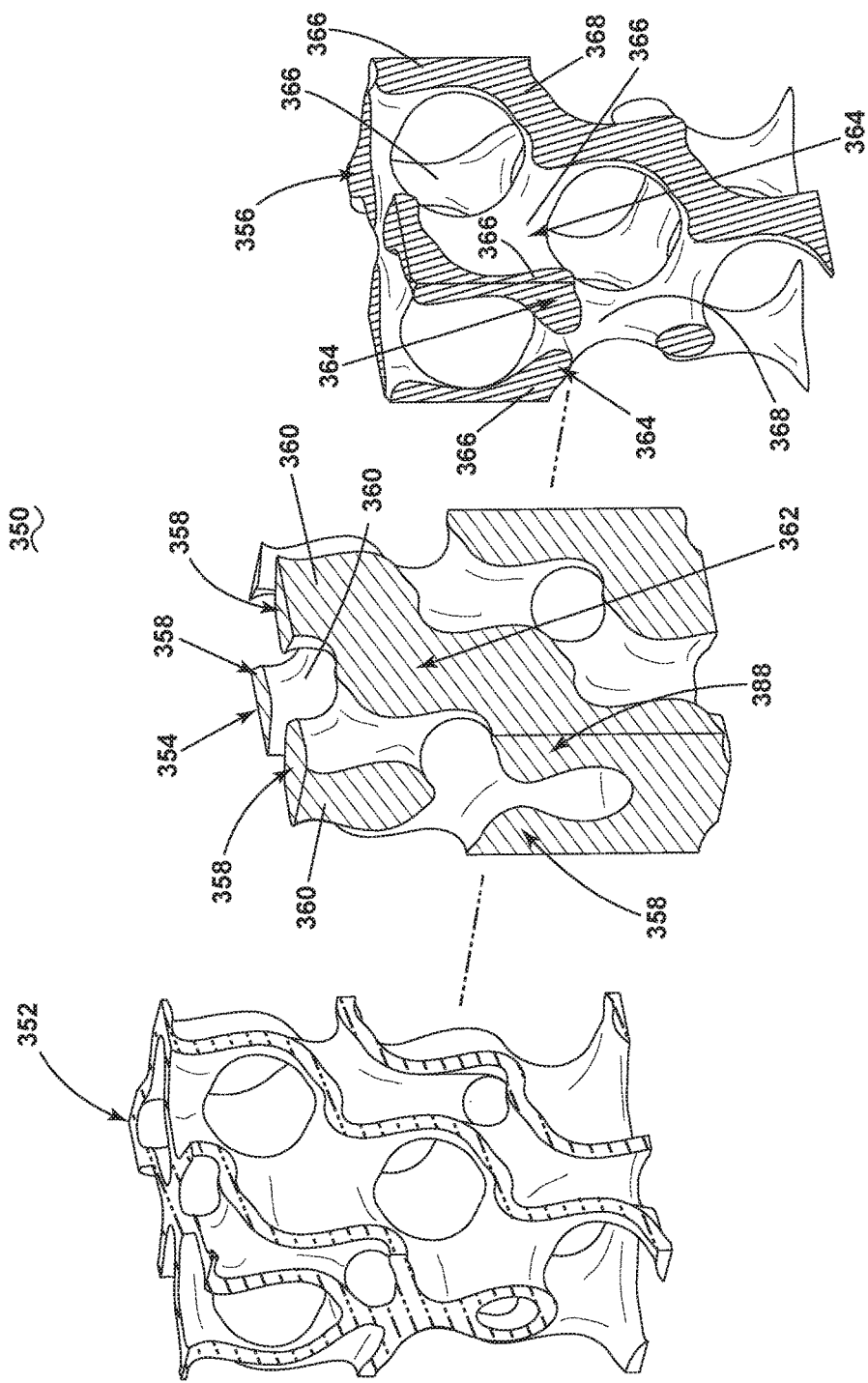
FIG. 27 is an exploded view of another exemplary lattice cell body having two sets of flow passages having a 1:2 aspect ratio and having furcated flow passages with three branches illustrated as solid elements defined by the lattice cell body in accordance with various aspects described herein.

Referring now to FIG. 27, yet another exemplary heat exchanger 350 is illustrated having a lattice cell body 352 with a first set of flow passage 354 and a second set of flow passages 356 exploded from the lattice cell body 352. The first and second sets of flow passages 354, 356 are illustrated as solid elements to facilitate understanding of the geometry of the first and second sets of flow passages 354, 356. The first set of flow passages 354 can include a first set of furcated flow passages 358 including three branches 360 that converge to a first interconnecting passage 362 and diverge to another first set of furcated flow passages 358. The diverging first set of furcated flow passages 358 can be rotated sixty-degrees relative to the converging first set of furcated flow passages 358 such that a three-way hyperbolic shape is formed through the first interconnecting passage 362.

Similarly, the second set of flow passages 356 can include one or more second sets of furcated flow passages 364 having three branches 366 that converge to a second interconnecting passage 368, and then diverge to another second set of furcated flow passages 364 with three branches 366 rotated sixty-degrees relative to the converging second set of furcated flow passages 364.

Figure 28:
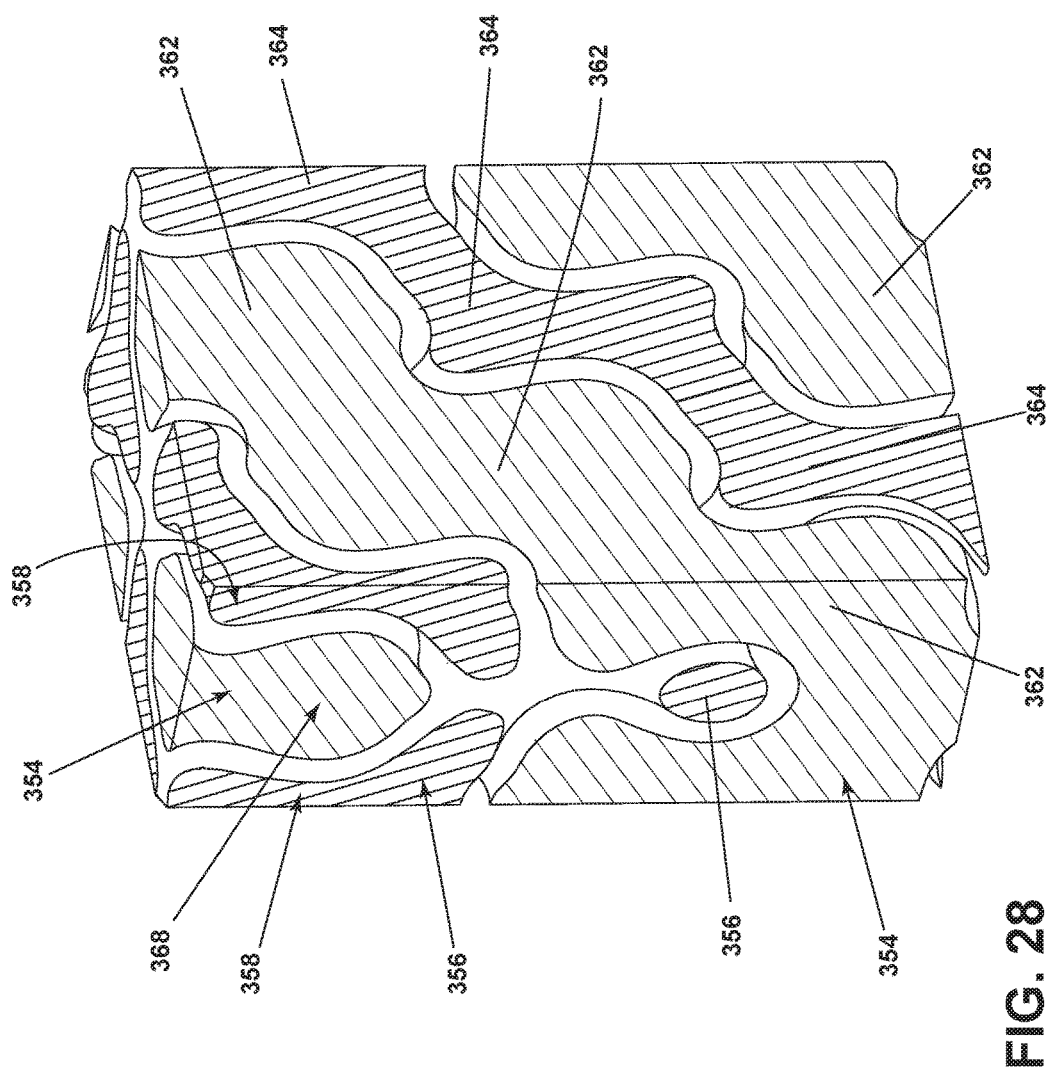
FIG. 28 is perspective view of the two sets of flow passages of FIG. 27 having the lattice cell body removed for clarity.

Referring now to FIG. 28, the first and second sets of flow passages 354, 356 are combined having the lattice cell body 352 removed for clarity. The first and second sets of flow passages 354, 356 can intertwine, similar to that of FIG. 24, having the first set of furcated flow passages 358 aligned with the second interconnecting passage 368 and the second set of furcated flow passages 364 aligned with the first interconnecting passages 3.

Figure 29:
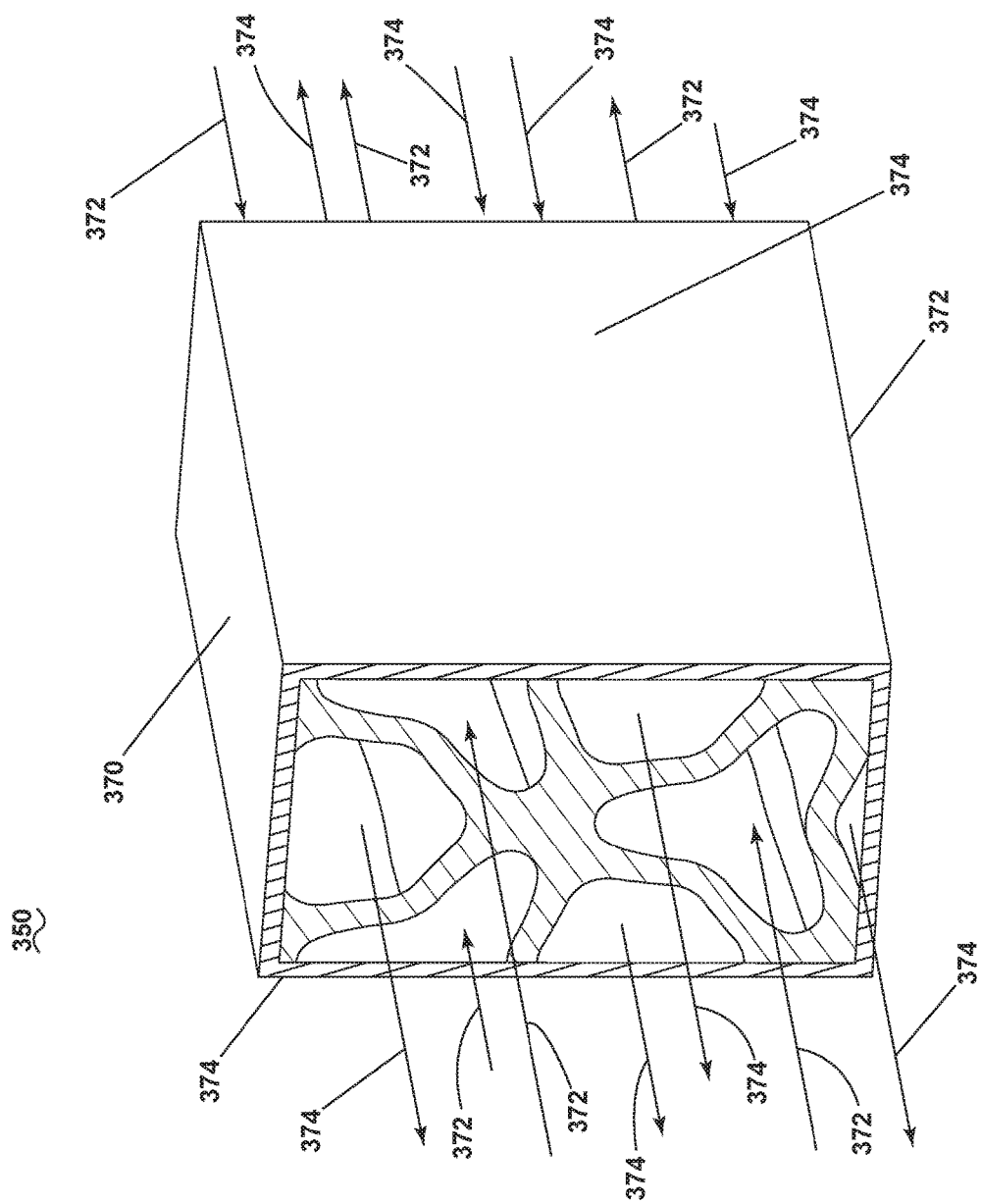
FIG. 29 is a perspective view of the view of the lattice cell body of FIG. 23 having the sides, top, and bottom enclosed to illustrate flow paths through the sets of flow passages.

Referring now to FIG. 29, the heat exchanger 350 is illustrated having a top 370, bottom 372, and sides 374 enclosed. A first flow direction 376 can be defined through the first set of flow passages 354 and a second flow direction 378 can be defined through the second set of flow passages 356 in a direction opposite of the first flow direction 376 to define a counter-flow through the heat exchanger 350. While illustrated as a having a counter-flow organization, the structure of the heat exchanger 350, the lattice cell body 352, or the organization sets of flow passages can define flow paths in any direction, and having the top 370, bottom 372, or sides 374, or lack thereof in any organization to define flows differing from that as shown. For example, a flow direction can be defined through the sides 374 to provide a crossflow relative to the first flow direction. In additional alternative examples, the flow directions can be in the same direction, or can be in any direction or orientation relative to one another as is desirable for the required performance of the heat exchanger or to facilitate ingress and egress of fluid at the heat exchanger.

It should be appreciated that the heat exchangers as described herein provide for improved heat transfer coefficients and improved heat exchanger efficiency. The hyperbolic shape of the sets of flow passages having the sets of furcated flow passages provides for a very small length-to-diameter ratio before requiring the passages to turn, converge, or diverge. The small ratio minimizes pressure drop along the sets of flow passages. Furthermore, the hyperbolic shape having saddle points provides for gradual flow direction changes, as opposed to sudden direction changes to improve heat transfer along such surfaces while minimizing pressure losses. Additionally, the latticed or quasi-latticed geometric structure of the heat exchanger minimizes the consequences of maldistribution by fully mixing the opposing flow paths of the first and second sets of flow passages with the intertwined organization. Similarly, the non-linear, complex geometry of the hyperbolic, furcated first and second sets of flow passages provides for an increased effective length for the heat exchanger, by as much as 50% or more, while minimizing total size of the heat exchanger. The increased effective length provides for improved heat transfer within the minimized total size. Further still, the hyperbolic, furcated, and intertwined geometry provides for greater heat transfer coefficients along the first and second sets of flow passages. Therefore, efficiency of the heat exchanger is improved, while minimizing pressure losses, minimizing heat exchanger size, and improving the heat transfer coefficients within the heat exchanger.

The heat exchangers as described further provide for improved manufacturability by additive manufacturing the heat exchangers, such as 3D printing including direct metal laser melting or direct metal laser sintering in non-limiting examples. The blocked-structures can be quickly and accurately manufactured by additive manufacturing to any size or orientation to meet the particular needs of the heat exchanger. Similarly, a non-horizontal orientation of the passages can provide for effective powder evacuation during manufacture.

The heat exchangers as described herein further provide for improved heat exchanger strength and structural integrity. The latticed or quasi-latticed structure provides for improved strength within the heat exchanger.

It should be appreciated that while the heat exchangers are illustrated as having set of furcated flow passages with either two branches or three branches in a particular organization, it is further contemplated that a heat exchanger can have first and second sets of flow passages that have furcated flow passages with two branches and three branches, respectively. In such an example, the lattice cell body can be structured with the first and second sets of flow passages intertwined with one another, and forming the latticed or quasi-latticed structures. It should be further appreciated that the furcated flow passages can have any number of branches, being two or more, and that organizations of such flow passages can be defined by the lattice cell body and intertwined within one another. In one such non-limiting example, a heat exchanger can have a first set of flow passages having furcated flow passages with four branches and a second set of flow passages having furcated flow passages with two branches intertwined within the first set of flow passages.

A method of forming a heat exchanger, which can be any of the heat exchangers as described herein, can include forming a lattice cell body wherein the lattice cell body includes a set of first furcated flow passages wherein the set of first furcated flow passages converge to a first interconnecting passage to define a hyperbolic shape and diverge into another set of first furcated flow passages, and wherein the lattice cell body includes a set of second furcated flow passages wherein the set of second furcated flow passages converge to a second interconnecting passages to define a hyperbolic shape and diverge into another set of second furcated flow passages. At least a portion of the first furcated flow passages are intertwined with at least a portion of the second furcated flow passages The first set of furcated flow passages and the second set of furcated flow passages can be any furcated flow passages as described herein, having two or more branches the can converge to the first interconnecting passage as described herein, and then diverge to another set of first furcated flow passages. In one non-limiting example, the set of first furcated flow passages that diverge from the first interconnecting passage can define a plane that is orthogonal to a plane defined by the converging set of furcated flow passages. Similarly, the second set of furcated flow passages can converge to the second interconnecting passage and diverge to another second set of furcated flow passages. The diverging second set of furcated flow passages can define a plane orthogonal to a plane defined by the converging second set of furcated flow passages. The first and second sets of furcated flow passages can intertwine with the first set of furcated flow passages in a manner similar to the intertwined first and second sets of passages as described herein. The forming a heat exchanger can further include forming by additive manufacturing such as 3D printing. Non-limiting examples of such additive manufacturing or 3D printing can include direct metal laser melting or direct metal laser sintering.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

What is claimed is:

1. A heat exchanger, comprising:
a first manifold defining a first fluid inlet;
a second manifold defining a second fluid inlet; and
a lattice cell body having:
a first set of flow passages in fluid communication with the first manifold, and where the first set of flow passages include a set of first furcated flow passages extending from the first fluid inlet and wherein the set of first furcated flow passages converge to a first interconnecting passage that forms a hyperbolic shape and diverges into another set of first furcated flow passages; and
a second set of flow passages in fluid communication with the second manifold, and where the second set of flow passages include a set of second furcated flow passages extending from the second fluid inlet and wherein the set of second furcated flow passages converge to a second interconnecting passage that forms a hyperbolic shape and diverges into another set of second furcated flow passages,
wherein at least a portion of the first furcated flow passages are intertwined with at least a portion of the second furcated flow passages.

2. The heat exchanger of claim 1 wherein at least one of the first set of flow passages or the second set of flow passages include a circular cross-section.

3. The heat exchanger of claim 1 wherein at least one of the first set of flow passages or the second set of flow passages include flow augmentation structures.

4. The heat exchanger of claim 1 wherein the first set of flow passages and the second set of flow passages include substantially the same size passages to provide a 1:1 aspect ratio.

5. The heat exchanger of claim 1 wherein the first set of flow passages and the second set of flow passages include differing size passages to provide a 1:2 aspect ratio.

6. The heat exchanger of claim 1 wherein the first set of flow passages and the second set of flow passages in the lattice cell body are oriented in one of a counterflow or a crossflow.

7. The heat exchanger of claim 1 wherein the lattice cell body includes a first portion defining the first set of flow passages and a second portion defining the second set of flow passages and where the first portion and the second portion are spaced to define a third set of flow passages.

8. The heat exchanger of claim 1 wherein the lattice cell body includes a first portion defining the first and second sets of flow passages and where the lattice cell body further includes a second portion positioned within the first set of flow passages to define a third set of flow passages and where the lattice cell body further includes a third portion positioned within the second set of flow passages to define a fourth set of flow passages.

9. The heat exchanger of claim 1 wherein the first set of flow passages has two inlets and two outlets at each intertwined junction with the second set of flow passages.

10. The heat exchanger of claim 1 wherein the first set of flow passages has one inlet and three outlets at a first intertwined junction with the second set of flow passages and the first set of flow passages has three inlets and one outlet at a second intertwined junction with the second set of flow passages.

11. A heat exchanger, comprising:
a body having a first set of hyperbolic flow passages in fluid communication with a first fluid inlet and where the first set of hyperbolic flow passages include a set of first furcated flow passages that include a number of saddle points, at which two of the set of first furcated flow passages asymptotically converge along one plane and then asymptotically diverge on an orthogonal plane and a second set of hyperbolic flow passages in fluid communication with a second fluid inlet and where the second set of hyperbolic flow passages include a set of second furcated flow passages that include a number of saddle points, at which two of the set of second furcated flow passages asymptotically converge along one plane and then asymptotically diverge on an orthogonal plane, wherein at least a portion of the first furcated flow passages and at least a portion of the set of furcated second flow passages intertwine.

12. The heat exchanger of claim 11 wherein the body is a lattice cell body.

13. The heat exchanger of claim 11 wherein the first set of flow passages and the second set of flow passages include substantially the same size passages to provide a 1:1 aspect ratio.

14. The heat exchanger of claim 11 wherein the first set of flow passages and the second set of flow passages include differing size passages to provide a 1:2 aspect ratio.

15. The heat exchanger of claim 11 wherein the first set of flow passages and the second set of flow passages in the lattice cell body are oriented in one of a counterflow or a crossflow.

16. The heat exchanger of claim 11 wherein the first set of flow passages has two inlets and two outlets at each intertwined junction with the second set of flow passages.

17. The heat exchanger of claim 11 wherein the first set of flow passages has one inlet and three outlets at a first intertwined junction with the second set of flow passages and the first set of flow passages has three inlets and one outlet at a second intertwined junction with the second set of flow passages.

18. A method of forming a heat exchanger, the method comprising:
forming a lattice cell body wherein the lattice cell body includes a set of first furcated flow passages wherein the set of first furcated flow passages converge to a first interconnecting passage to define a hyperbolic shape and diverge into another set of first furcated flow passages, and wherein the lattice cell body includes a set of second furcated flow passages wherein the set of second furcated flow passages converge to a second interconnecting passage to define a hyperbolic shape and diverge into another set of second furcated flow passages;
wherein at least a portion of the first furcated flow passages are intertwined with at least a portion of the second furcated flow passages.

19. The method of claim 18 wherein the forming comprises additive manufacturing.

20. The method of claim 18 wherein the additive manufacturing includes direct metal laser melting or direct metal laser sintering.

* * * * *